United States Patent
Pandey et al.

(10) Patent No.: US 11,983,476 B2
(45) Date of Patent: May 14, 2024

(54) TECHNOLOGY-INDEPENDENT LINE END ROUTING

(71) Applicant: International Business Machines Corporation, Armonk, NY (US)

(72) Inventors: Diwesh Pandey, Jeevan Bhima Nagar (IN); Gustavo Enrique Tellez, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 63 days.

(21) Appl. No.: 17/389,931

(22) Filed: Jul. 30, 2021

(65) Prior Publication Data

US 2023/0036710 A1    Feb. 2, 2023

(51) Int. Cl.
G06F 30/394    (2020.01)
G06F 30/392    (2020.01)
G06F 111/04    (2020.01)

(52) U.S. Cl.
CPC .......... *G06F 30/394* (2020.01); *G06F 30/392* (2020.01); *G06F 2111/04* (2020.01)

(58) Field of Classification Search
USPC ....................................................... 716/119
See application file for complete search history.

(56) References Cited

U.S. PATENT DOCUMENTS

| | | | |
|---|---|---|---|
| 9,213,793 B1 | 12/2015 | Salowe | |
| 10,521,097 B1 | 12/2019 | Lam | |
| 10,726,187 B2 | 7/2020 | Pandey | |
| 2002/0069397 A1* | 6/2002 | Teig | G06F 30/392 716/113 |
| 2004/0044979 A1* | 3/2004 | Aji | G06F 30/394 716/135 |
| 2004/0257207 A1* | 12/2004 | Elassaad | G06F 30/327 340/425.1 |
| 2007/0106969 A1 | 5/2007 | Birch et al. | |
| 2007/0164785 A1* | 7/2007 | He | G06F 30/34 326/41 |
| 2011/0296360 A1 | 12/2011 | Wang et al. | |
| 2015/0113484 A1* | 4/2015 | Yuan | G03F 1/70 716/55 |
| 2016/0275228 A1* | 9/2016 | Tskitishvili | G06F 30/392 |
| 2018/0225402 A9* | 8/2018 | De Dood | G06F 30/39 |
| 2019/0146455 A1* | 5/2019 | Beylkin | G06F 30/392 700/97 |
| 2019/0385300 A1 | 12/2019 | Baidya | |

(Continued)

OTHER PUBLICATIONS

Ding, Yixiao et al. Throughput optimization for SADP and e-beam based manufacturing of 1D layout. In2014 51st ACM/EDAC/IEEE Design Automation Conference (DAC) Jun. 1, 2014 (pp. 1-6). IEEE.

(Continued)

*Primary Examiner* — Mohammed Alam
(74) *Attorney, Agent, or Firm* — Erik Johnson; Otterstedt & Kammer PLLC

(57) ABSTRACT

One or more line ends of a putative integrated circuit design are modelled using a constraint graph. A longest path algorithm is applied on subgraphs of the constraint graph. An extent minimization algorithm is carried out on the subgraphs of the constraint graph and routing on the putative integrated circuit design is carried out based on results of the longest path algorithm and the extent minimization algorithm.

20 Claims, 16 Drawing Sheets

(56) References Cited

U.S. PATENT DOCUMENTS

| | | | |
|---|---|---|---|
| 2020/0026962 A1* | 1/2020 | Sha | G03F 7/705 |
| 2020/0083074 A1* | 3/2020 | Clark | H01L 21/67276 |
| 2020/0104449 A1* | 4/2020 | Pandey | G06F 30/394 |
| 2022/0408372 A1* | 12/2022 | Feuersaenger | H04W 52/146 |
| 2023/0036710 A1* | 2/2023 | Pandey | G06F 30/392 |
| 2023/0042059 A1* | 2/2023 | Pandey | G06F 30/398 |

OTHER PUBLICATIONS

Francisco, L., Lagare, T., Jain, A., Chaudhary, S., Kulkarni, M., Sardana, D., Davis, W. R., Franzon, P. (2020). Design rule checking with a CNN based feature extractor. Proceedings of the 2020 ACM/IEEE Workshop on Machine Learning for CAD. https://doi.org/10.1145/3380446.3430625 (6 pages).

Pan, D. Z., Minsik Cho, Kun Yuan, Yongchan Ban. (2008). Lithography Friendly Routing: From construct-by-correction to correct-by-construction. 2008 9th International Conference on Solid-State and Integrated-Circuit Technology. https://doi.org/10.1109/icsict.2008.4735031 (4 pages).

Bai, X., Xiao, D., Zhu, W., & Chen, J. (2019). An initial detailed routing algorithm considering advanced technology nodes. 2019 China Semiconductor Technology International Conference (CSTIC). https://doi.org/10.1109/cstic.2019.8755638 (3 pages).

Goncalves, S. M., Rosa, L. S., & Marques, F. S. (2020). Draps: A design rule aware path search algorithm for detailed routing. IEEE Transactions on Circuits and Systems II: Express Briefs, 67(7), 1239-1243. https://doi.org/10.1109/tcsii.2019.2937893 (pp. 1239-1243).

Sun, F .- K., Chen, H., Chen, C.-Y., Hsu, C.-H., Chang, Y.-W. (2018). A multithreaded initial detailed routing algorithm considering global routing guides. Proceedings of the International Conference on Computer-Aided Design. https://doi.org/10.1145/3240765.3240777 (7 pages).

Dr. CU 2.0: A Scalable Detailed Routing Framework with Correct-by-Construction Design Rule Satisfaction, Computer-Aided Design (ICCAD) 2019 IEEE/ACM International Conference on, pp. 1-7, 2019. https://ieeexplore.IEEE.org/document/8942074).

A. Hetzel Research Institute for Discrete Mathematics, Hetzel, A., Mathematics, R. I. for D., Metrics, O. M. V. A. (Feb. 1, 1998). A sequential detailed router for huge grid graphs: Proceedings of the Conference On Design, automation and test in Europe. ACM Conferences. Retrieved Jan. 24, 2023, from https://dl.acm.org/doi/10.5555/368058.368167 (pp. 332-338.).

Wei, Y.-C., Samanta, R., Li, & Y.-L. (2018). Lesar: A dynamic line-end spacing aware detailed router. 2018 Design, Automation Test in Europe Conference Exhibition (2018). https://doi.org/10.23919/date.2018.8342244 (pp. 1485-1488.).

Dehon, A., Huang, R., & Wawrzynek, J. (2002). Hardware-assisted fast routing. Proceedings. 10th Annual IEEE Symposium on Field-Programmable Custom Computing Machines. https://doi.org/10.1109/fpga.2002.1106675 (pp. 1-11.).

Cadence Space-based Router downloaded on Apr. 12, 2021 from https://www.cadence.com/en_US/home/company/newsroom/press-releases/pr/2007/cadencespacebasedrouterwinsedninnovationaward forelectronicdesignautomation.html. (3 pages.).

Paul J. Otterstedt, List of IBM Patents or Patent Applications Treated as Related, Nov. 24, 2023, 2 pages.

* cited by examiner

Path search

EUV constraints        SADP constraints

Disjoint interval formation

Type A

Type B

Type C

Type D

Type E

Line end violation on M2 layer, 800
can only be solved by reducing density

Line end violation on M3 layer, 820
can only be solved by reducing density

| Var | LB | UB | Wt |
|---|---|---|---|
| A | 10 | 95 | 1 |
| B | 20 | 55 | 1 |
| C | 20 | 55 | -1 |
| D | 70 | 85 | 0 |
| E | 80 | 95 | -1 |
| F | 100 | 145 | 1 |
| G | 100 | 145 | -1 |

Objective(*) = -165

TECHNOLOGY-INDEPENDENT LINE END ROUTING

BACKGROUND

The present invention relates to the design and manufacture of integrated circuits (ICs), and more specifically, to VLSI designs, design tools, and devices based on the analysis and optimization of such circuits.

In VLSI (very large-scale integration) digital design, fabricated devices conventionally include millions of transistors implementing hundreds of storage devices, functional logic circuits, and the like. The designs are often segmented or partitioned into sub-blocks (such as cores, units, macros, sub-hierarchies, and the like) to make the design process more manageable. For example, the design, placement, and routing of the circuits may be conducted at both a high-level and sub-block level, where the high-level considers the complete device including all sub-blocks (known as in-context design) and the sub-block level considers the design of a single sub-block (known as out-of-context design).

Extreme Ultraviolet Lithography (EUV) and multi-patterning based lithography solutions (Self-Aligned Double Patterning (SADP)) have become key choices for the manufacturing of lower metal layers. These technologies utilize very complex line end rules which impose huge challenges in routing. In an environment of rapid technological change where mixed lithographic solutions are utilized, it becomes essential to rapidly develop tools for routing, especially for modern, dense, designs. The challenges raised by a change of foundry require quick decisions and rapid tool development to meet the often aggressive time to market goals.

SUMMARY

Principles of the invention provide techniques for technology-independent line end routing. In one aspect, an exemplary method includes the operations of modelling one or more line ends of a putative integrated circuit design using a constraint graph; applying a longest path algorithm on subgraphs of the constraint graph; carrying out an extent minimization algorithm on the subgraphs of the constraint graph; and carrying out routing on the putative integrated circuit design based on results of the longest path algorithm and the extent minimization algorithm.

In one aspect, a non-transitory computer readable medium comprises computer executable instructions which when executed by a computer cause the computer to perform a method comprising modelling one or more line ends of a putative integrated circuit design using a constraint graph; applying a longest path algorithm on subgraphs of the constraint graph; carrying out an extent minimization algorithm on the subgraphs of the constraint graph; and carrying out routing on the putative integrated circuit design based on results of the longest path algorithm and the extent minimization algorithm.

In one aspect, an apparatus comprises a memory and at least one processor, coupled to the memory, and operative to perform operations comprising modelling one or more line ends of a putative integrated circuit design using a constraint graph; applying a longest path algorithm on subgraphs of the constraint graph; carrying out an extent minimization algorithm on the subgraphs of the constraint graph; and carrying out routing on the putative integrated circuit design based on results of the longest path algorithm and the extent minimization algorithm.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. Some embodiments may not have these potential advantages and these potential advantages are not necessarily required of all embodiments. For example, one or more embodiments may provide one or more of the following advantages:

- a very fast, scalable, technology-independent solver for line ends;
- addresses both SADP and EUV technology;
- achieves up to 65% density for conventional designs with near optimal solution;
- without line end solver, it is impossible to RIT (i.e., tape-out or Release Interface Tape) any 7 nm (and future EUV- and SADP-technology based) chips;
- improve the technological process of integrated circuit design via reduced design cycle time;
- improve the technological process of integrated circuit design via reduced number of design iterations;
- improve the technological process of integrated circuit design via improved designer efficiency;
- improve the technological process of integrated circuit design via optimized designs that operate at intended design specifications; and
- improved performance of integrated circuits designed using aspects of the invention, as compared to those not designed using aspects of the invention, at least under conditions where there is the same CPU time budget for the design process.

These and other features and advantages of the present invention will become apparent from the following detailed description of illustrative embodiments thereof, which is to be read in connection with the accompanying drawings.

DETAILED DESCRIPTION

Routing Aspects

Figure 1A:
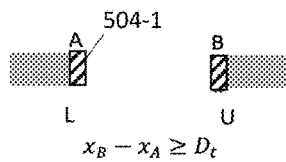
FIG. 1A illustrates example paths between a number of source and destination pairs, in accordance with an example embodiment.

Consider systems, techniques and methods for improved VLSI checking and routing, including producing VLSI designs and devices based on improved EUV checking and routing. Typically, a router (i.e., software program for performing routing in integrated circuit (IC) design) has two main components: a checker and a path search task. The checker creates a multi-dimensional shape data structure for potentially billions of shapes (common in large designs) and checks for legal positions of shapes based on various design rule constraints. The path search task determines paths for connections between a source (S) and destination (D) in coordination with the checking step. FIG. 1A illustrates example paths 104-1, 104-2, 104-3 (nets and paths are used interchangeably herein) between a number of source and destination pairs, in accordance with an example embodiment. Together, the paths as depicted in FIG. 1A represent a solution graph. (Conventionally, checking and path search reside inside the router and work hand in hand.) Each arrow in FIG. 1A represents a relationship between two path endpoints that is constrained by a design rule.

Figure 1B:
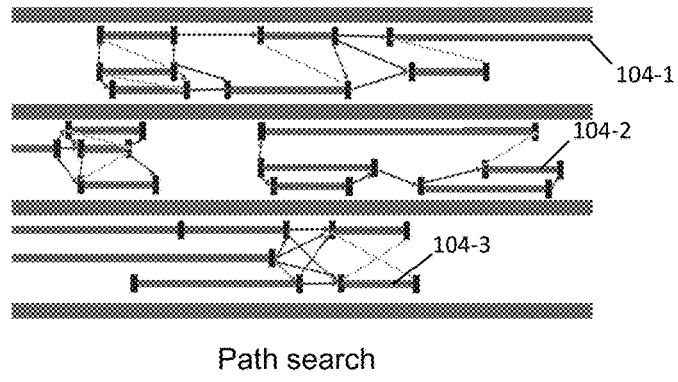
FIG. 1B illustrates example design constraints and their corresponding mathematical modeling, in accordance with an example embodiment.

FIG. 1B illustrates example design constraints and their corresponding mathematical modeling, in accordance with an example embodiment. EUV poses very complex design rules which can be modeled with linear programming, where most of the design rules are associated with integer constraints, as shown in the integer linear programming (ILP) formulation of FIG. 1B. (ILP is an NP hard (non-deterministic polynomial-time hardness) problem to solve.) For example, design rule 1 specifies minimum spacing and minimum length requirements for a net. Design rule 2 requires a minimum amount of space between the ends of lateral neighboring nets. Design rule 3 requires that a lateral neighboring net not end within the excluded area of the given net. (Lateral neighboring nets refer to metal shapes on the same layer. In one example embodiment, the lateral neighboring nets includes neighboring metal shapes of the same net.) Routers inherently are not made to solve such difficult problems without compromising on run time; existing detail routers are not capable of handling such complex, adjacent end of line rules efficiently. As a result, 95% of total runtime is utilized by the checker. Moreover, as the modelling of EUV rules is highly complex within the router in the presence of many other rules, the run times are often unacceptably long.

In one example embodiment, a fast EUV checker is modeled external to the router to make the detail routing task separate from and independent of the checking task; the router works principally on path search. Solutions to otherwise infeasible problems are optimized by iteratively running the EUV router and the detail router followed by the checker. In one example embodiment, only routing that is associated with technologies that have complex rules, such as EUV, are checked outside the router and other technologies that have less complex rules are checked within the router. The checker, in the worst case, has a linear time complexity and thus produces a solution very quickly. The checker may be run anywhere in the workflow to check for design violations. In one example embodiment, the routing task (including detail routing) is performed followed by the checking task in an iterative fashion. This process is repeated until a satisfactory solution is found, such as a solution that exhibits no EUV violations.

Interactive Router (Adjacent End-Of-Line (AEOL) Router)

An AEOL router is heavily used in back-end design flow during multiple steps. It is a de facto router for solving all AEOL EUV violations, and advantageously enables higher design density for modern, high-power, high-reliability processors such as in the IBM P- and Z-series machines available from International Business Machines Corporation, Armonk, NY, USA. Without running an AEOL router, hundreds of violations in small designs are typically encountered, while large designs encompass thousands of such violations. It is generally impossible to fix such a high count manually. Thus, an AEOL router has been key in enabling next generation P and Z microprocessors and is suitable, for example, for other modern, high-power, high-reliability processors and future generations of same. In experimental results, the disclosed technique reduced runtime by more than two-thirds. For a macro of the same size as that described in the Background of the Invention above (#nets: 1,198,650), the run time was 6.5 hours (compared to 20 hours for conventional techniques).

Solution Graph

In one example embodiment, the infrastructure for a new checker is created using a constraint graph. Each node in the graph represents a position of an end of a metal shape (net) and each arc in the graph represents an EUV rule constraint between two nodes (ends of metal nets). The solution of the graph is computed using, for example, a shape processing algorithm, as described in U.S. Patent Publication 2020/0104449, entitled "Self-aligned Double Patterning-aware Routing in Chip Manufacturing." In one example embodiment, the constraint graph is partitioned into sub-graphs to optimize the analysis of the constraint graph. For example, disconnected portions of a constraint graph may be generated by pruning arcs between inter-portion nodes of the different portions. This is possible based on the positions of those inter-portion nodes being constrained by a spacing which is sufficiently large to find a legal position for the node. By constraining the positions of specified nodes, the arc that constrains the positional relationship between the specified nodes can be removed. Each of the portions can be treated as subgraphs for purposes of optimizing the positions of the nodes. Note that FIG. 1A depicts the solution graph; the violation graph is derived from the solution graph for further processing, and the violation graph can (in some instances) be a subset of the solution graph. Thus, a separate illustration of a violation graph is not provided as a subset of the solution graph of FIG. 1A is also illustrative of one non-limiting example of a violation graph.

Figures 2, 3:
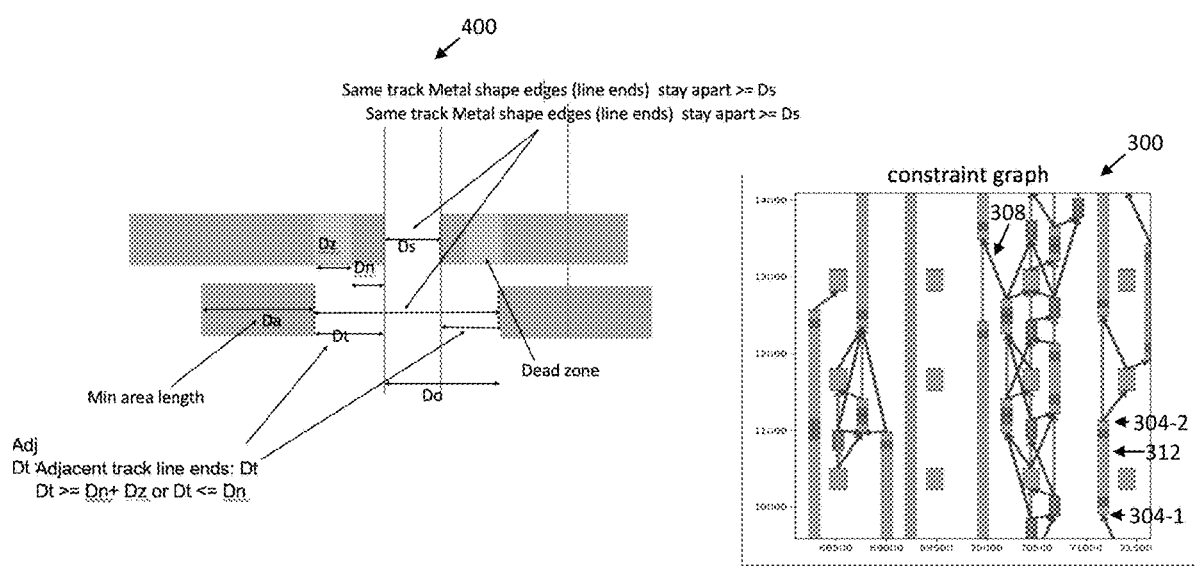
FIG. 2 is an illustration of various combinations of line end constraints (e.g., for EUV technology), in accordance with an example embodiment.
FIG. 3 is an illustration of an example constraint graph based on the line end constraints of FIG. 2, in accordance with an example embodiment.

FIG. 2 is an illustration of various combinations of line end constraints, in accordance with an example embodiment. For example, a net may be required to have 1) a minimal length Dl; 2) a minimal area Da; 3) a minimal distance (separation) Ds between line ends; 4) a minimal spacing $D_o$ between opposite direction neighboring track shapes; and/or 5) an exclusion (dead) zone for a line end (where the distance Dt between line ends of neighboring nets in the same direction must be greater than Dn+Dz or less than Dn). (As used herein, in the present context, the opposite direction refers to a scenario where, in a set of two metal shapes, one metal shape has a line end on its left edge and the other metal shape has a line end on its right edge. As used herein, in the present context, the same direction refers to a scenario where both of the metal shapes have line ends on the same edge, either both on their left edge or both on their right edge. As used herein "right" and "left" are relative terms.)

FIG. 3 is an illustration of an example constraint graph 300 based on the line end constraints of FIG. 2, in accordance with an example embodiment. As noted above, each arc (arrow; such as arc 308) in the constraint graph 300 represents an EUV rule constraint between two nodes, such as nodes 304-1, 304-2 (which represent the ends of metal shape 312), in a routing solution.

Figure 4:
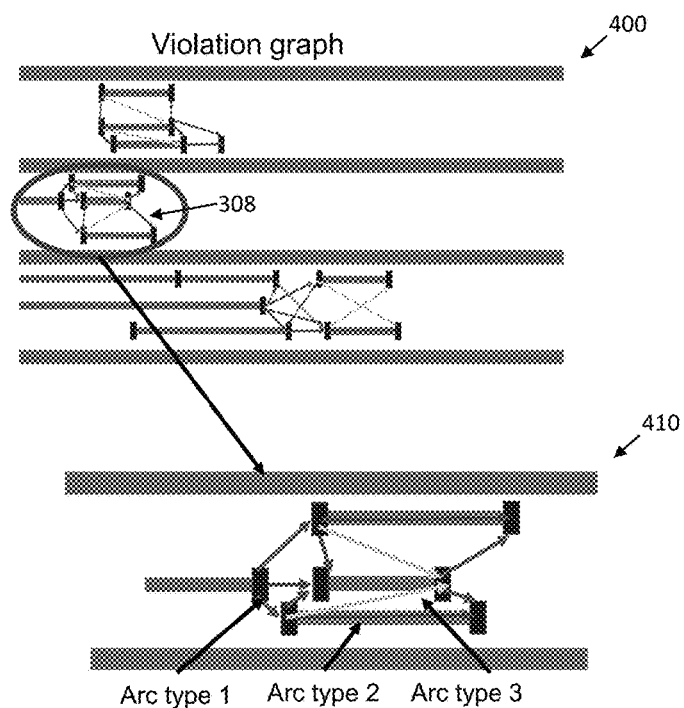
FIG. 4 is an illustration of an example violation graph, in accordance with an example embodiment.

FIG. 4 is an illustration of an example violation graph 400, in accordance with an aspect of the invention. The checker is run on the solution graph and a violation graph 400 (containing metal shapes in violation of design rules) is computed from the solution graph, honoring all the applicable rules. In general, each sub-graph of the solution graph is searched for an arc(s) where a design rule is violated; such a graph is considered a violation graph 400. Each described arc type of the violation graph 400 (e.g., Arc type 1, Arc type 2, and Arc type 3) indicates a unique EUV rule and inherits a corresponding complexity. A violation graph 400 can contain multiple violation subgraphs 410 containing a disjoint set of metal shapes with design rule violations. The checker provides a huge saving in the total turn-around time necessary to deliver complex microprocessor designs, and the like, on time.

Regarding complexity, the skilled artisan will appreciate that computational complexity theory focuses on classifying computational problems according to their resource usage, and relating these classes to each other. A computational problem in this context is a task solved by a computer. A computation problem in this context is solvable by mechanical application of mathematical steps, such as an algorithm.

Figure 5A:
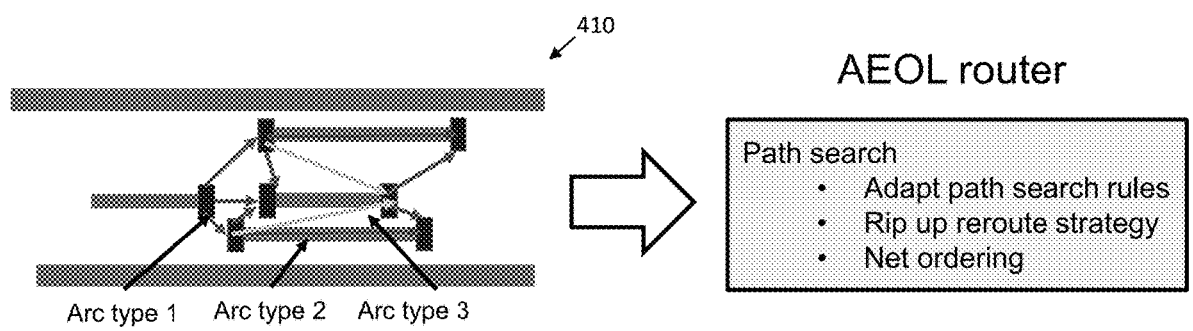
FIG. 5A shows a violation graph as input to the AEOL router, in accordance with an example embodiment.
Figure 5B:
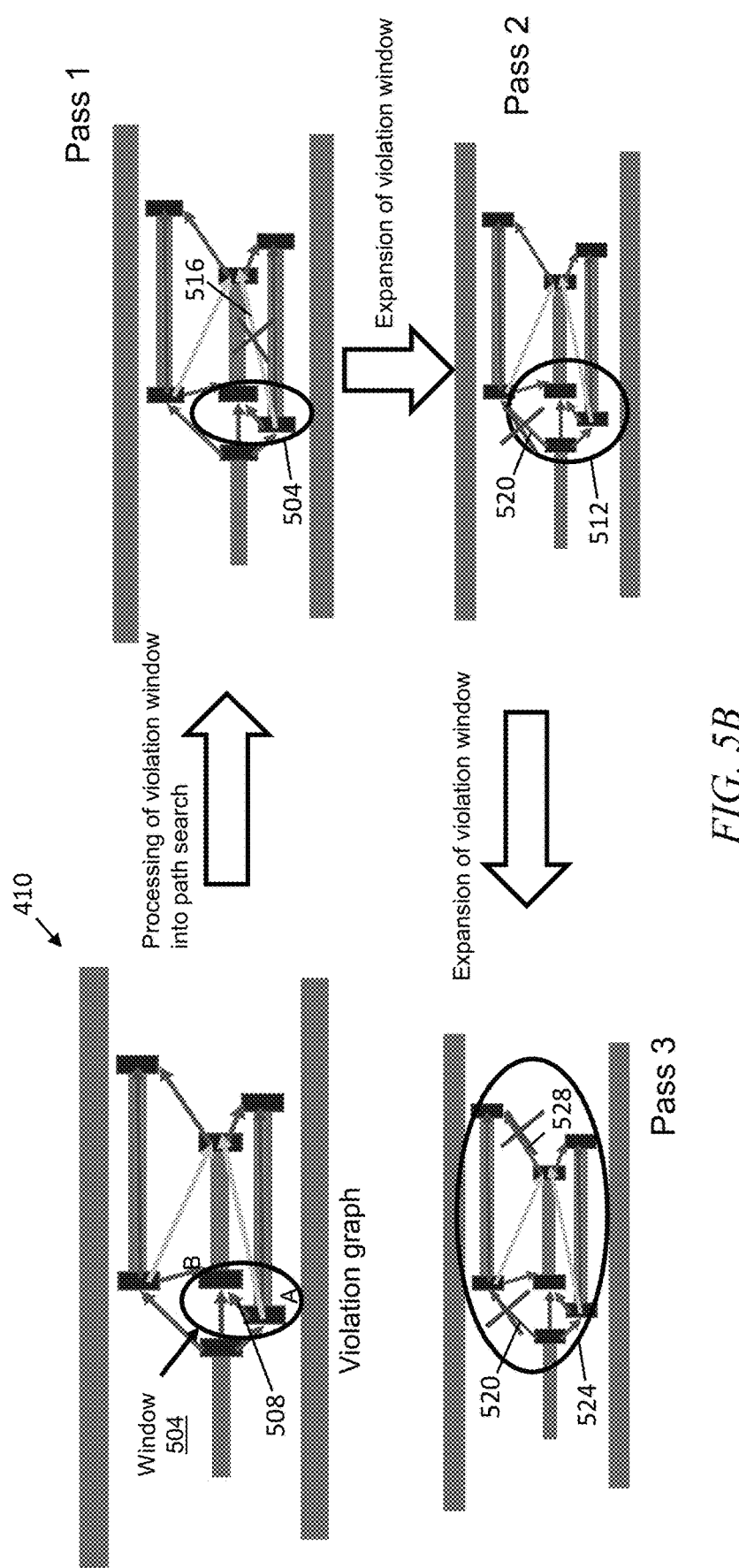
FIG. 5B shows the evolution of the violation graph during multiple passes of the checker and router, in accordance with an example embodiment.

FIG. 5A shows a violation graph 410 as input to the AEOL router, in accordance with an example embodiment. The AEOL router utilizes adaptable path search rules, various rip-up and reroute strategies and net ordering in conducting the path search task on the violation graph 410, as described more fully below. As illustrated in the FIG. 5A, arc types are defined to model different design rules; each design rule and corresponding arc type has an associated complexity. The violation graph 410 can be processed to perform a path search in a very controlled manner so that rip-ups (areas designated for rerouting) and reroutes are minimized, path search rules are adapted based on the violation being considered, and net ordering is optimized. In one example embodiment, a violation window (window, violation window, and constraint window are used interchangeably herein) is created for a given violation graph 410 and the breadth of the rip-ups is controlled (limited) based on the size of the window. FIG. 5B shows the evolution of the violation graph 410 during multiple passes of the checker and router, in accordance with an example embodiment. As illustrated in FIG. 5B, there is a violation of the design rule that is represented by an arc 508 between node A and node B. A relatively small window 504 is defined around the arc 508 between node A and node B in order to have the path search routine focus on the routing area that is in violation of the design rule. In one example embodiment, the window 504 is set to span two tracks in both the direction of the tracks and the direction orthogonal to the tracks. (In one or more embodiments, the window 504 is created for all the layers; hence, for some layers, the tracks will be in the horizontal direction while, for other layers, the tracks will be in the vertical direction.) The window 504 is then increased in size by N tracks for each iteration where N equals, for example, two, three, five, and the like (N can be determined heuristically/empirically by the skilled person for the particular application, given the teachings herein). Moreover, even though arc 516 is within window 504, arc 516 is marked such that the router does not consider arc 516 during the rip-up and rerouting in Pass 1, which is performed to address the design rule violation of arc 508. For each new pass of the detail routing, the window is expanded and arcs are chosen selectively. In one example embodiment, all types of arcs (design rules) are processed in a first pass, type 1 and 2 arcs (design rules) are processed in a second pass, and type 3 arcs (design rules) are processed in subsequent passes, where more complex design rules have a higher type number. It is also possible to process all the arcs 308 together in one pass and then just reselect one particular type of arc 308 in a subsequent pass. It is also possible to have multiple arcs 308 of the same type in a window 504. In general, if there are two or more violations in a violation graph 410, a check is made regarding what arc types are associated with them. For example, in Pass 1, process all the violations regardless of the arc types and check the solution. If there is still a violation, go to Pass 2, and only process the arcs associated with violation type 2. This could potentially be done for all of the violations. The window would encompass the multiple violations and normal routing would be performed.

The arcs marked with a cross (X) are the arcs, such as arc 516, which are not selected in the window 504. For example, if the rip-up and rerouting eliminates the violation, the process ends; otherwise, as illustrated in FIG. 5B, the window 504 is expanded to a larger window 512 where an arc 520 that is within the window 512 is excluded from consideration by the router during a Pass 2. Once again, if the rip-up and rerouting of Pass 2 eliminates the violation, the process ends; otherwise, as illustrated in FIG. 5B, the window 512 is expanded to a larger window 524 where arcs 520, 528 that are within the window 524 are excluded from consideration by the router during a Pass 3. Thus, the rules concerning path search, rip-up reroute strategy and net ordering are adapted based on the complexity of the design rule. (In one example embodiment, nets having complex design rules are identified as critical nets and their status is utilized in ordering the nets for processing during routing.)

Based on the complexity of the arcs, the rules defining the path search are adapted. Different strategies related to the rip-up and reroute strategy in the path search are selected based on the given arc type; these strategies influence rip-up and re-route, and depend on factors such as window size, net ordering, block-out region, and arc type selection. In addition, as described above, one or more embodiments enable the optimization of the ordering of the nets by, for example, processing nets constrained by complex design rules during the earlier passes of the routing task. Furthermore regarding net ordering, when different types of arcs are selected, they are processed in a specific order. Arcs are associated with metal shapes, and these metal shapes are associated with a particular net. When these nets are encountered in the path search, they are placed in a specific order; for example, try to solve the net associated with the most complex arc (e.g., Arc type B, Arc type C) first. It is desirable to order these arcs in advance and process the nets associated with them first.

Referring again to FIG. 5B, in one or more embodiments, based on the arc type, when processing, create a search region and expand the window in subsequent passes. Within the window, allow for rip-up and re-route. In one or more embodiments, also insert block-out regions depending on the arc types. For example, select Arc type A and based on Arc type A select a block-out region. For a different arc type, a different block-out region, or no block-out region, might be selected. Ordering of the nets can also be based on the Arc type, and the search region can be defined, which depends on which search/iteration is being run.

Interactive EUV Router and Detail Router

Figure 6:
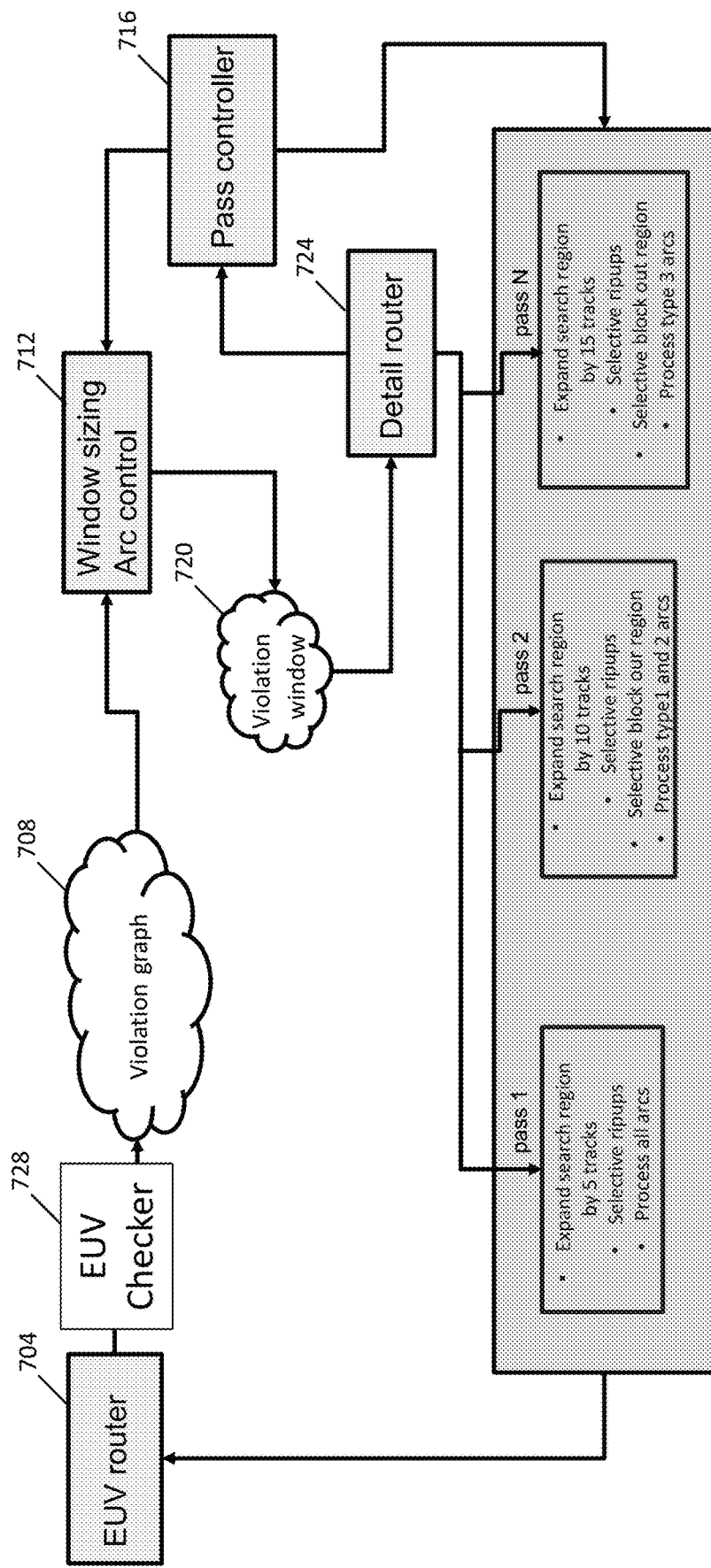
FIG. 6 is a combined workflow and block diagram for an example checker and interactive EUV router and detail router, in accordance with an example embodiment.

FIG. 6 is a combined block diagram and workflow for an example checker and interactive EUV router and detail router, in accordance with an example embodiment. Each pass of the routing is defined by a specific strategy which controls the search (rerouting) region window, arc types and block out regions. In each progressive pass, the search region is expanded by a certain number of tracks. Each pass includes a specific strategy which controls the search region window, arc types and block out regions. For example, in one example embodiment, only type 1 and type 2 arcs are processed during pass 2, while all types of arcs are processed during pass 1.

Initially, a routing solution is obtained from the EUV router 704. If there are no violations due to infeasible scenarios, the routing is complete; otherwise, the violation graph 708 is generated by the EUV checker 728. The violation graph 708 is then processed by the detail router 724. For each pass of the detail router 724, a violation window size and arc selection are determined. Window sizing and arc control 712 (selection of included and excluded arcs) is then specified by a pass controller 716 which determines the violation window 720 and the corresponding arc selection. A search region is defined within the detail router 724 based on a given violation window and the detail router 724 processes the non-excluded arcs within the violation window 720.

During (starting) Pass 1, the search region is defined with a default size of, for example, five tracks and all arcs in the window 504 are processed (the size can increase in each subsequent pass as appropriate). During Pass 2, if needed, the search region is expanded by, for example, ten tracks and type 1 and type 2 arcs (corresponding to the simpler design rules) in the window 512 are processed (with a selective block out region). During Pass N, if needed, the search region is expanded by, for example, fifteen tracks and type 3 arcs (corresponding to more complex design rules) in the window 524 are processed (with a selective block out region). It is noted that the number of arc types is not limited to three and that a fewer or greater number of arc types are contemplated as well as a different selection of track counts and arc types, per pass. If the types of arcs of a given pass do not exist within the corresponding violation window 720, the types of arcs corresponding to a subsequent pass may be processed. Block out regions are created based on arc selection and associated metal shapes. For example, block out regions may be employed for certain types of arcs and not employed for other types of arcs. The block out region directs the path search algorithm to take an alternate path(s), if one exists. If an alternate path that eliminates the violation does not exist, then the block out region is expanded to encompass more tracks. In one example embodiment, only the highlighted part of the track is blocked and that part will be blocked for all the nets. The block outs are used by arc types associated with complex rules, such as design rules 2 and 3 in FIG. 1B. The preceding steps are run in iteration until the solution converges (no design violations remaining) or time out occurs (e.g., exit if time exceeds a pre-selected maximum time or a preselected number of passes are exceeded (N>predetermined value), as can be determined heuristically/empirically by the skilled person, given the teachings herein).

Thus, by way of review, when a track is blocked, the router will try to get an alternate path (legal solution), away from the blocked region. Then, check whether the alternate solution is correct or not. If an illegal solution is still obtained, expand the block-out region to create a larger (more tracks) block-out region, re-do the calculations, and check the solution again. Consider picking a track for blocking out—the block-out region depends on the arc type; based on the arc type, a metal shape is queried and the empty space around that particular metal shape (which is already in violation) is checked. Then, create the block-out region around that particular metal shape. In one or more embodiments, start with just the track the shape is on; optionally, add adjacent tracks as well.

Figure 7A:
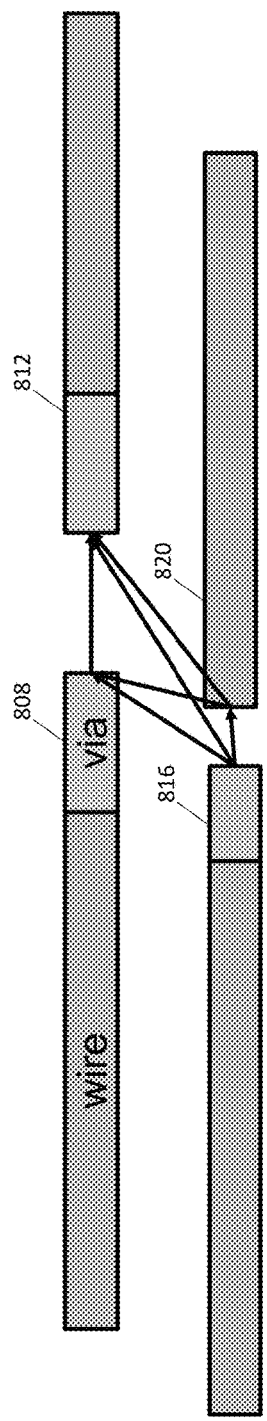
FIGS. 7A, 7B, and 7C illustrate a selective rip-up and a block out region creation, in accordance with an example embodiment.
Figure 7B:
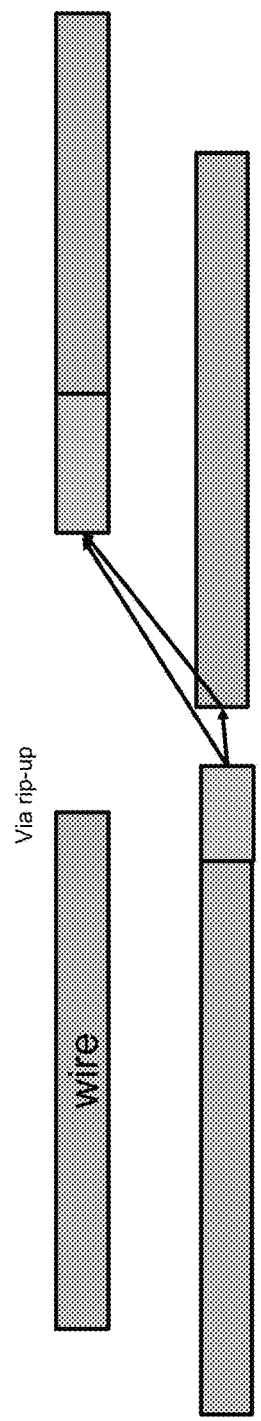
Figure 7C:
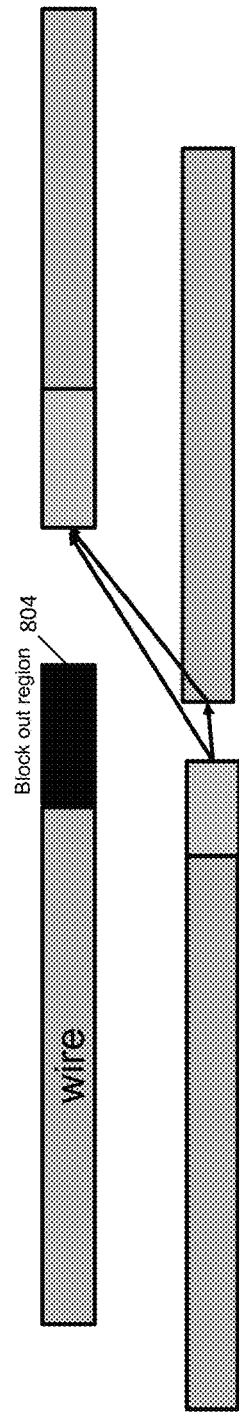

FIGS. 7A-7C illustrate a selective rip-up and a block out region creation, in accordance with an example embodiment. As illustrated in FIG. 7A, via 808 has arcs (arrows) connecting via 808 to the line ends of neighboring nets 812, 816, 820 where each arc represents a constraint of a design rule. One or more these design rules may be violated by the current routing solution. For example, via 808 is identified as violating a design rule and, as such, is "ripped-up" and removed from the current routing solution, as illustrated in FIG. 7B. The location of the via 808 is then tagged as a block out region 804 to indicate that the identified portion of the corresponding track is blocked out from routing, that is, no metal shapes may be positioned there during the next iteration of the routing task, as illustrated in FIG. 7C. Block-out region can thus be selected based on a location of a violation or arc type with a complex design rule (e.g., Type B or Type C), for example.

Line End Routing Aspects

Figure 8A:
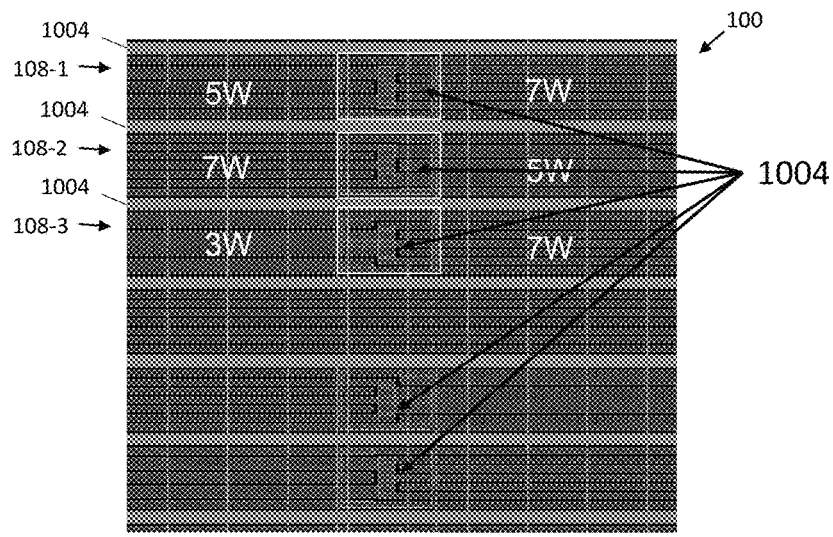
FIG. 8A illustrates an example spacing pattern of a VLSI device utilizing SADP technology, in accordance with an example embodiment.

Generally, systems, techniques and methods are disclosed for a technology-independent architecture for line end routing. FIG. 8A illustrates an example spacing pattern of a VLSI device 100 utilizing SADP technology, in accordance with an example embodiment. Each SADP layer starts as a sea of unidirectional, unbroken wires where there are a limited set of allowed Mx wire combinations, such as 7 W (1×), 5 W (3×), 3 W (5×) (where 7 W refers to a channel 108-1 containing seven wires, 5 W refers to a channel 108-2 containing five wires, and 3 W refers to a channel 108-3 containing three wires; where 1× refers to a wire of default width for the technology, 3× refers to a wire having a width that is three times the default width for the technology, and 5× refers to a wire having a width that is five times the default width for the technology; where Wsp represents the width of the spacing pattern; and where separators 1004 separate the channels 108-1, 108-2, 108-3). In one or more embodiments, in the vertical direction the power rails do the job of separators, while in the horizontal direction, specific insulators are placed in the design and referred to as separators. These separators breaks the two WSP regions such as 7 W and 5 W. Line end breaks are created by the insertion of cuts or trim shapes where the cut/trim shapes are used to create a cut mask which produces the final shapes in the layout.

Figure 8B:
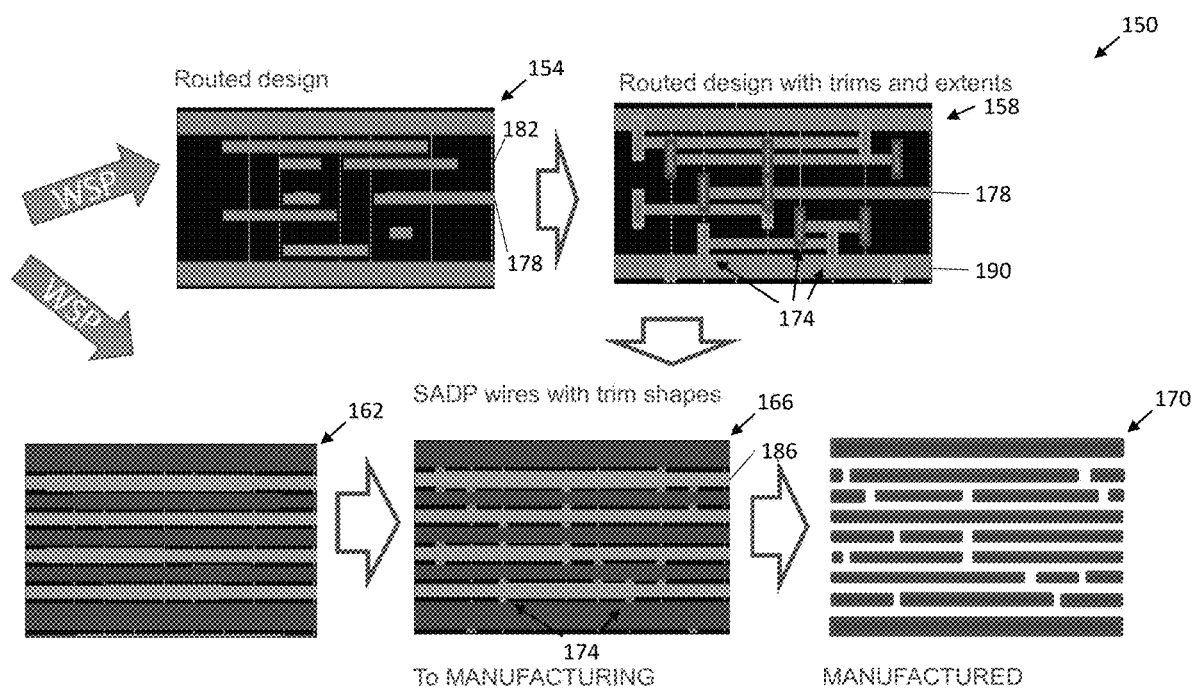
FIG. 8B illustrates an example flow for SADP technology, in accordance with an example embodiment.

FIG. 8B illustrates an example flow 150 for SADP technology, in accordance with an example embodiment. In SADP technology, routing changes drastically due to multiple and continuous track patterns, new manufacturing rules defined by SADP, and the cut mask (trim requirement). This leads to a number of primary problems, including finding a feasible solution for trim shapes, erroneous placement of trims (resulting in opens and shorts in the design), difficulties with the insertion of trims (which depend on the available gaps between wire segments), difficulties with a conventional router's ability to optimize the gaps, infeasible issues (such as metal shape spacing requirements provided by a foundry, technology provider, or manufacturer that require rip-up and rerouting of wires and vias), degradation in routing quality (opens and shorts), and undesirable effects from the trims affecting the rip-up and reroute strategy in the detail routing. Line end rules, such as minimum spacing, can be problematic in some cases. (Note that the terms "trim" and "cut" are used interchangeably herein.)

As illustrated in FIG. 8B, a routing design for the VLSI device 100 of FIG. 8A is obtained and the trims (cut points) and corresponding extents (if needed, as described more fully below) are incorporated into the routing design 154 to generate a revised routing design 158. The revised routing design 158 is used to generate a trim (cut) mask that is overlayed on the VLSI device 100 of FIG. 8A, a portion of which is represented by spacing pattern 162 (prior to masking) and spacing pattern 166 (after masking). Following lithography and etching, the wires of the spacing pattern 166 appear as illustrated by the routing pattern 170.

Thus, in one or more embodiments, start with a routed design 154 and insert trim shapes (such as trim shape 174), which come from the technology family, and indicate where the wires (such as wire 186) need to be cut. In routed design 154, note the position of metal shapes 178 and empty regions 182. In actuality, the wires 186 are everywhere at this stage (see view 162). The tool places the trim shapes 174 as seen in view 158. These trim shapes 174 are cut out to create the wire segments of the routed design. View 170 shows where the trim shapes 174 are inserted and thus the wires are cut. In one or more embodiments, a mask is created for the metal shapes 178 and the metal underneath is etched to create the gaps between the wire segments. Thus, in the SADP process, there are pre-existing wires and the lithographic masks are used to make cuts and connections. It is noted that the metal shapes utilized as power rails, such as power rail metal shape 190, can be ignored in terms of trim insertion.

Figure 9:
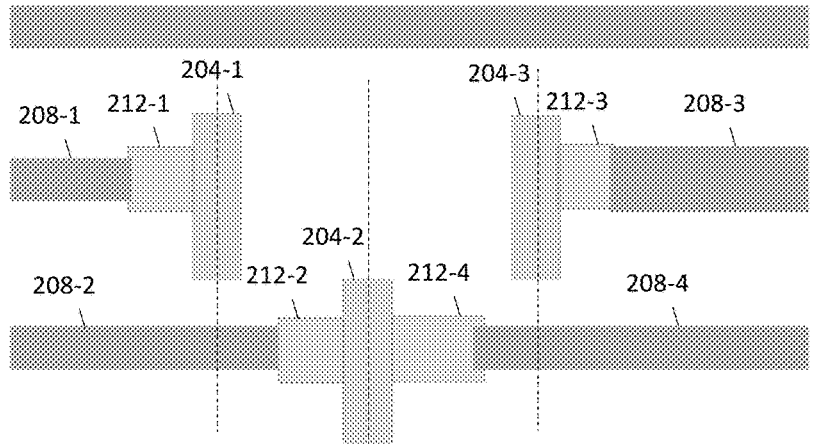
FIG. 9 illustrates an example of the trim and extend process, in accordance with an example embodiment.

FIG. 9 illustrates an example of the trim and extend process, in accordance with an example embodiment. The unnumbered top metal shape is, for example, a power shape that can be ignored. Trims 204-1, 204-2, 204-3 are required to be placed at the end positions of wires (also referred to as fixed metal shapes herein) 208-1, 208-2, 208-3, 208-4 while meeting all the applicable design rules. Extents 212-1, 212-2, 212-3, 212-4 are routing symbols that are used to represent metal shapes that extend the wires 208-1, 208-2, 208-3, 208-4 to the locations of the trims 204-1, 204-2, 204-3 in situations where the location of the trims 204-1, 204-2, 204-3, as dictated by the routing design 204 and the applicable design rules, does not match the end of the corresponding wire 208-1, 208-2, 208-3, 208-4.

Note that wires 208-1 and 208-3 are part of a first signal track and wires 208-2 and 208-4 are part of another signal track. The width of the extents is exaggerated for clarity but can be similar to the track width in one or more embodiments.

Solution for SADP Routing

In one example embodiment, interaction between the shapes-based optimization of the trim and extend algorithms and the rip-up and reroute flow of the router includes the following tasks:
1) execution of a trim and extend algorithm and the creation of constraint graph;
2) a method to solve infeasible trim placement issues utilizing relaxed constraints and a rip-up and reroute strategy during the detail routing;
3) performing rip-up and reroute based on the trim/extent solution; and
4) utilizing a heuristic solver to optimize the trim locations and minimize the extent length.

Advantageously, one or more embodiments of the disclosed line end solver make it feasible to RIT (i.e., tape-out or Release Interface Tape) 7 nm (and future EUV- and SADP-technology based) chips. Heretofore, infeasible scenarios have been encountered in such cases, such as insufficient space to fix a spacing violation between metal shapes, which may be created by the prior-art router and require ripping-up and rerouting of the metal shapes.

Figure 10:
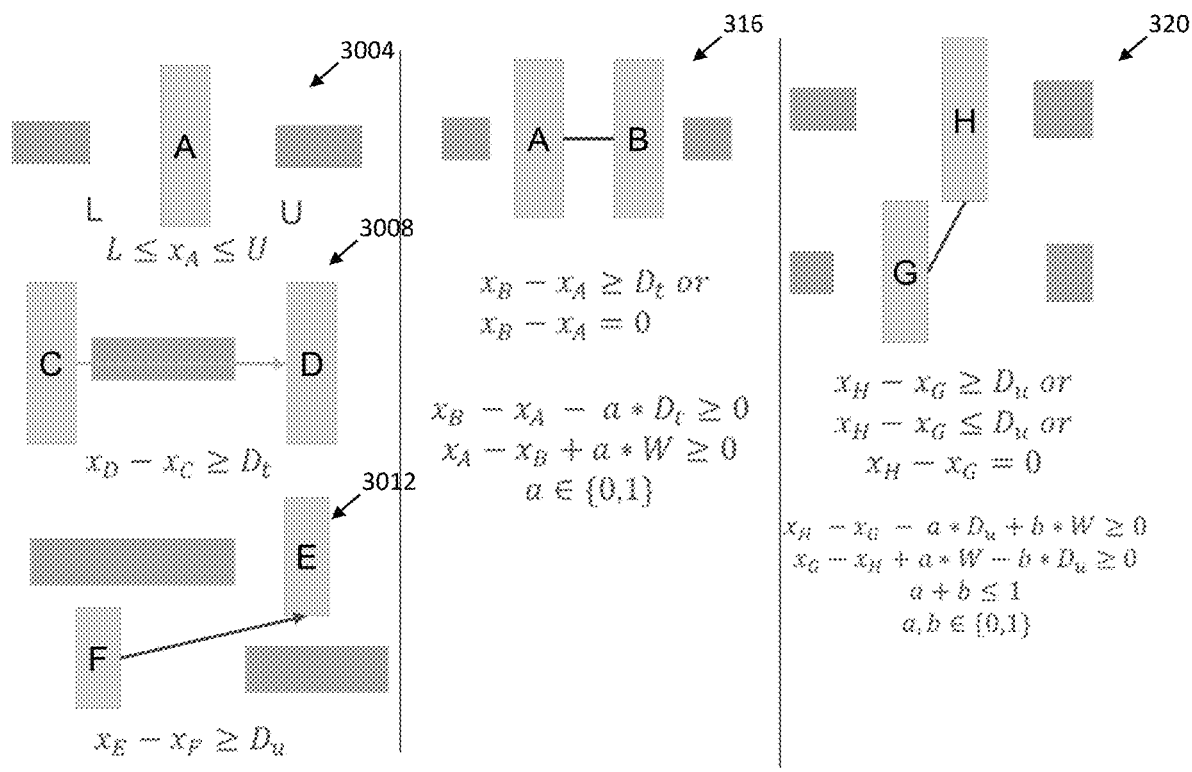
FIG. 10 illustrates example design constraints and their corresponding mathematical modeling, in accordance with an example embodiment.

FIG. 10 illustrates example design constraints and their corresponding mathematical modeling, in accordance with an example embodiment. The formulation of the problem using Integer Linear Program (including a constraint graph) and the provisioning of a heuristics based solution for SADP routing is described in co-assigned U.S. Patent Publication 2020/0104449, entitled "Self-aligned Double Patterning-aware Routing in Chip Manufacturing" (the '449 publication) Given the teachings herein and a knowledge of known techniques such as that disclosed in the '449 publication, the skilled artisan can implement one or more embodiments. The graph represents an ILP (Integer Linear Program), which exactly models the legal positions of the trim shapes, and has an objective, which is to minimize the length of the extent shapes.

As illustrated in design rule 3004, the location $x_A$ of trim A is required to be between lower bound location L and upper bound location U. As illustrated in design rule 3008, the minimum length of a wire is $D_t$; thus, location $x_C$ of trim C is required to be separated from the location $x_D$ of trim D by at least $D_t$. As illustrated in design rule 3012, the minimum distance between trims of adjacent wires is $D_u$; thus, location $x_F$ of trim F is required to be separated from the location $x_E$ of trim E by at least $D_u$. As illustrated in design rule 316, the minimum distance between trims of wires on the same track is $D_t$; thus, location $x_A$ of trim A is required to be separated from the location $x_B$ of trim B by at least $D_t$. In the example, the parameter a is either zero or one. Alternatively, trim A and trim B are allowed to merge together, if possible, such that the minimum distance between trims of wires on the same track is 0. (Note that the variables a and b assume a value of zero or one, where the sum of the selected values for the variables a and b is less than or equal to one. As will be apparent to the skilled artisan given the teachings herein, the values may be assigned randomly, may be based on an order prescribed by a corresponding algorithm, and the like.)

As illustrated in design rule 320, the minimum distance between trims of wires in adjacent tracks is $D_u$; thus, location $x_H$ of trim H is required to be separated from the location $x_G$ of trim G by at least $D_u$. Alternatively, trim G and trim H are allowed to merge together, if possible, such that the minimum distance between trims of wires in the adjacent tracks is 0. In the example, the parameters a and b are either zero or one.

FIG. 2 is an illustration 400 of various combinations of line end constraints (e.g., for EUV technology), in accordance with an example embodiment. For example, a net may be required to have 1) a minimal length Dl; 2) a minimal area Da; 3) a minimal distance (separation) Ds between line ends; 4) minimal spacing between opposite direction neighboring track shapes Do; and/or 5) an exclusion (dead) zone (see discussion elsewhere herein) for a line end (where the distance Dt between line ends of neighboring nets in the same direction must be greater than or equal to Dn+Dz or less than or equal to Dn).

FIG. 1B illustrates example design constraints and their corresponding mathematical modeling, in accordance with an example embodiment. EUV, for example, poses very complex design rules which can be modeled with linear programming where most of the design rules are associated with integer constraints, as shown in the integer linear programming (ILP) formulations of FIG. 1B. (ILP is an NP hard problem to solve.) In FIG. 1B, the cross-hatched tabs, such as tab 504-1, are used to model or mathematically formulate a line end (i.e., virtually create a line end shape) and may be considered to have a width of zero. For example, design rule 1 specifies minimum spacing and minimum length requirements for a net (similar to the design rules of FIGS. 10 and 2). $D_t$ is the minimum distance between metal shapes. The parameter x with a given subscript refers to the x-coordinate of the corresponding shape.

Design rule 2 requires a minimum amount of space between the ends of lateral neighboring nets. The length here is the length parallel to the axes of the neighboring metal shapes, i.e., projected onto the horizontal axis not the diagonal length. Dt and Du are different because there are two different cases (spaced and overlapping). Design rule 3 requires that a lateral neighboring net not end within the excluded region 520 of the given net. (Lateral neighboring nets refer to metal shapes on the same layer. In one example embodiment, the lateral neighboring nets includes neighboring metal shapes of the same net.)

Technology-Independent Infrastructure Modelling

Figure 11:
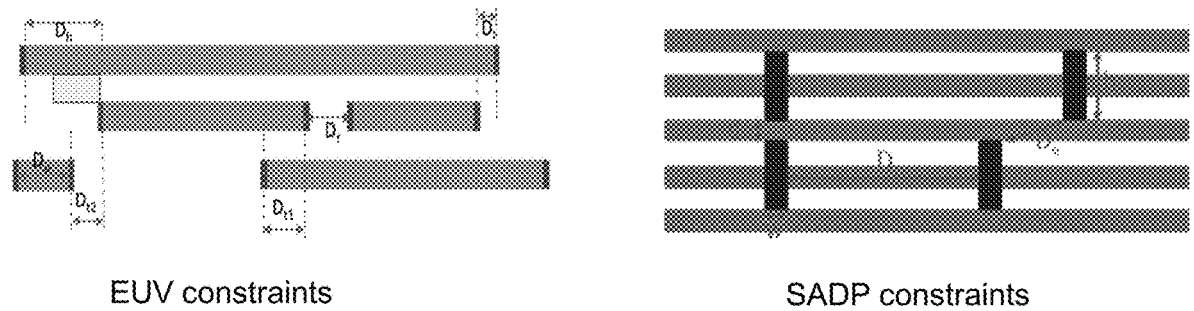
FIG. 11 illustrates example EUV and SADP design constraints, in accordance with an example embodiment.

FIG. 11 illustrates example EUV and SADP design constraints, in accordance with an example embodiment. The locations of the line ends are optimized (by shortening or lengthening the metal shapes) such that the line ends are as close as possible to their original routing location while satisfying the design constraints. As described above, the design rules constrain the metal shapes to minimal lengths, minimal distances between line ends on the same track, minimal distances and restricted areas between line ends on different tracks, and the like. Trims have specified widths w and lengths h, as illustrated by the SADP constraints. Thus, one or more embodiments optimize the location of metal line ends considering different rules. In the EUV constraints on the left, the bottom row shows two shapes with a wide separation. The line ends of the two metal shapes can thus travel in that region. Metal is placed to meet the line-end rules. Exemplary SADP constraints are seen on the right-hand side. Trims in SADP are represented by nodes and line end positions in EUV are represented by nodes, in one or more embodiments.

In one example embodiment, a technology-independent infrastructure is defined to:
  define a common model for EUV technology and SADP technology;
  define artificial trims for EUV (which simulate the SADP behavior of placing trims);
  enable, using the artificial trims, one step towards mixed technology implementation;
  simulate a dummy metal rule in SADP with metal gaps in EUV; and
  introduce a common model to handle track patterns and WSPs (width of spacer pattern $w_{sp}$) (which are specific to SADP).

In order to model EUV technology in a manner similar to SADP technology, artificial trims are defined for EUV technology such that the same infrastructure may be utilized for both technologies. The artificial trims may then be relocated to accommodate the various EUV design rules, as described above in conjunction with the SADP example. Also, as in the SADP example, extents (short metal wires), such as extent 212-1 may be inserted to extend the metal wire, such as 208-1, to the location of the corresponding trim 204-1.

Technology-Independent Problem Formulation

In one example embodiment, a technology independent modelling of trim and extents is derived using a constraint graph G(V, E) (where G is the graph, V the vertexes/nodes, and E the edges). In one or more embodiments, the modelling is technology-independent at least in the sense that both SADP and EUV can be handled.

For SADP, given a layout L(R), which includes rectangular metal shapes R={$R_i$|i=1, . . . , |R|}, a potential trim shape $S_i$ is modelled as a node $v_i \in V$ in the graph G(V, E).

For EUV, given a layout L(R), the position of a line end, or tip $T_i$, is modelled as a node $v_i \in V$ in the graph G(V, E).

As EUV does not have a trim shape requirement, a dummy (artificial) trim is placed at the line end position to simulate the behaviors of SADP technology.

The position of each trim shape $S_i$ is bounded by the positions of the rectangles: the lower bound is denoted $L_i$ and the upper bound is denoted $U_i$. Each rectangle has two movable line ends. The variable $x_i$ represents the position of the corresponding line end. The arcs $e_{i,j} \in E$ in $G(V, E)$ represent spacing relationships (design rules) between neighboring trim shapes $S_i$ and $S_j$. Each arc is accompanied by a set of constants, $\{W_{i,j}, D^h_{i,j}, D^l_{i,j}, c_{i,j}\}$, and a pair of integer variables, $\{a_{i,j}, b_{i,j}\}$. Values $D^h_{i,j}, D^l_{i,j}$ are different spacing constraints between nodes, indices i and j identify two nodes connected by a corresponding arc, and $W_{i,j}$ is a weight assigned based on the weights of the nodes identified by the indices i and j (where i and j are the two nodes connected to the arc; $W_{i,j}$ can assume any of the values of $-1$, 0, and 1; $W_i$ represents weight of the node i; and $W_j$ represents weight of the node j). As noted, the values for $W_{i,j}$ are fixed to $-1$, 0 and 1. In one or more embodiments, a computer program implementing aspects of the invention chooses these values one by one and tries to find the optimum solution using them; whichever value gives the best solution is taken finally.

Technology-Independent Mathematical Derivation

The spacing relationships between two trim shapes are then given by the following equations:

$$x_j - x_i - a_{i,j} * D^l_{i,j} + b_{i,j} * W_{i,j} \geq 0 \quad (1)$$

$$x_i - x_j + a_{i,j} * W_{i,j} - b_{i,j} * D^h_{i,j} \geq 0 \quad (2)$$

$$c_{i,j} <= a_{i,j} + b_{i,j} <= 1, a_{i,j}, b_{i,j}, c_{i,j} \in \{0,1\} \quad (3)$$

The purpose of the integer values $a_{i,j}$, $b_{i,j}$ and $c_{i,j}$ is to implement the "or" constraints, which occur due to disjoint intervals of the spacing constraints. Trims i and j are respectively located at $x_i$ and $x_j$; $a_{i,j}$, $b_{i,j}$, and $c_{i,j}$ can each take on 0 or 1 values.

In one example embodiment, the optimization objective is to minimize the total length of the line end extents. To model this objective, a weight is assigned to each node $n_i, w_i \in \{-1, 0, 1\}$, which drives the trim shape towards its optimal solution, where $w_i$ is the weight of the corresponding node. A weight of $-1$ is used if the trim is being repositioned towards its lower bound and a weight of $+1$ is used if the trim is being repositioned towards its upper bound, as illustrated in FIGS. 3 and 5.

The Line End Optimization (LEO) Problem is then defined as:
given a graph $G(V, E)$:
Minimize $\Sigma_{i \in n} w_i x_i$ subject to: (1),(2),(3)

$$L_i <= x_i <= U_i.$$

The problem as formulated is a MILP (Mixed Integer Linear Program).

Figure 12:
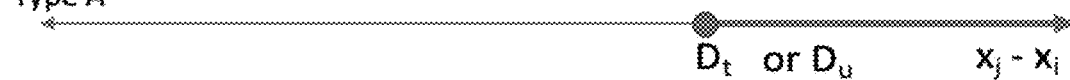
FIG. 12 illustrates an example disjoint interval formation, in accordance with an example embodiment.
Figure 12:
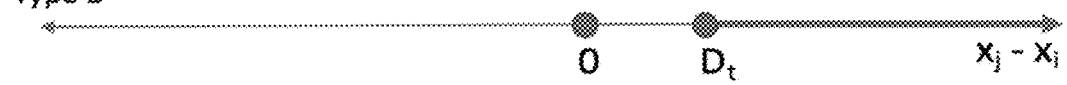
Figure 12:
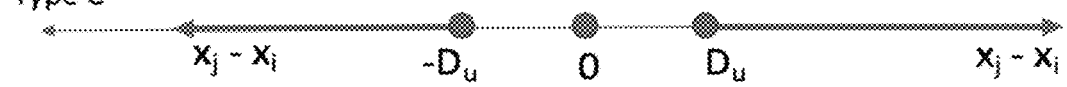
Figure 12:
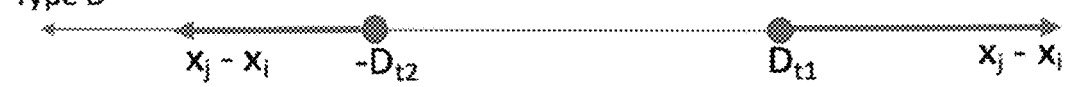
Figure 12:

FIG. 12 illustrates an example disjoint interval formation, in accordance with an example embodiment. The feasible regions of arcs and their spacing constraints are modelled as inequality intervals. For example, for Type A arcs, the location $x_j$ of trim J is required to be separated from the location $x_i$ of trim I by at least $D_t$ or $D_u$, and trim J is required to be located toward the upper bound in relation to trim I (where $D_t$ and $D_u$ are spacing constraints defined by the corresponding technology). For Type B arcs, the location $x_j$ of trim J is required to be separated from the location $x_i$ of trim I by at least $D_t$, and trim J is required to be located toward the upper bound in relation to trim I. Alternatively, the trims J and I may be located at the same position. For Type C arcs, the location $x_j$ of trim J is required to be separated from the location $x_i$ of trim I by at least $D_u$; alternatively, the trims J and I may be located at the same position. Similar interpretations apply to Type D and Type E arcs.

Thus, with regard to modelling the feasible regions of arcs and their spacing constraints as inequality intervals, some arcs are simple (have a single rule associated with them) and some arcs are more complicated. FIG. 12 shows five types of arcs, Type A through Type E, as discussed. For type A arcs, the influence is to the right. For Type B arcs, the influence is to the right or at zero. For Type C arcs, the influence is to the right of Du, to the left of $-$Du, or at zero. For Type D, there are two intervals of influence; namely, less than $-D_{t2}$, and greater than $D_{t1}$. Refer to discussion of arc types elsewhere herein.

The SADP and EUV design rules are modelled with the following simplifications of the constraints (1), (2), and (3):
Type "A" arcs: set $a_{i,j}=1$, $b_{i,j}=0$, and $D^l_{i,j}=D_t$ or $D^l_{i,j}=D_u$.
Type "B" arcs: set $b_{i,j}=0$, and $D^l_{i,j}=D_t$.
Type "C" arcs: set $c_{i,j}=0$, $D^l_{i,j}=D_u$, $D^h_{i,j}=D_u$.
Type "D" arcs: set $c_{i,j}=1$, $D^l_{i,j}=D_{t1}$ and $D^h_{i,j}=D_{t2}$.
Type "E" arcs: set $c_{i,j}=1$, $D^l_{i,j}=D_h$ and $D^h_{i,j}=D_h$, set $c_{i,j}=1$, $D^l_{i,j}=-D_l$ and $D^h_{i,j}=-D_l$. (Note that type "E" arcs have two spacing constraints, $D^h$ and $D^l$. Both of these values can be positive or negative; hence, to model the two spacing constraints, two sets of conditions are utilized.)

In one example embodiment, a solution to the graph (including nodes and arcs) is defined with a set of novel approaches to target run time, quality, and density goals. In one or more embodiments, the overall solution includes:

1) longest path based algorithm (LPA) on subgraphs with Heuristic integer variable assignments (highly scalable with respect to run time and guarantees to produce a solution if it exists); and
2) extent minimization algorithm on subgraphs (helps in pushing density limits for the designs).

Practical Solution for ILP

In one example embodiment, a linear program is derived from ILP by relaxing its integer constraints. The success of the algorithm typically requires the exploration of the space of integer variable assignments. This is accomplished in one or more embodiments by exhaustively enumerating all possible arc constraints for all arcs in a subgraph, until a feasible solution is found, if one exists. By assigning an integer value, one constraint is taken at one time and processed through the LP algorithm. The enumeration of all the integer values will take exponential time; hence, the following novel fast heuristic solution (for variable ordering), which converges very quickly and produces a feasible solution, is defined:

1) group arcs, by type, in alphabetical order (e.g., A to E). (The groups are therefore ordered number of feasible regions in the arc; hence, simpler arcs are processed first.)
2) order the arcs (arcs are bounded by metal shapes) within each group by their initial slack $K_{i,j}$. (The initial slack is obtained from the longest path algorithm oracle, before the algorithm starts; hence, tighter arcs (more restrictive arcs) within a group are processed first. Slack, in the present context, refers to the minimal distance that the arc may move. "Slack" in this context is in essence a "path slack" which should not be confused with "slack" in the context of timing, which refers to the margin between the data signal and the clock signal; if the data signal arrives with time to spare, there is positive timing slack; if the data signal arrives just in time, there is zero timing slack; and if the data signal arrives too late, there is negative timing slack.)

3) order the feasible regions for each arc from left to right (or right to left) such that the region nearest to the ideal solution is tried first.

Figure 13:
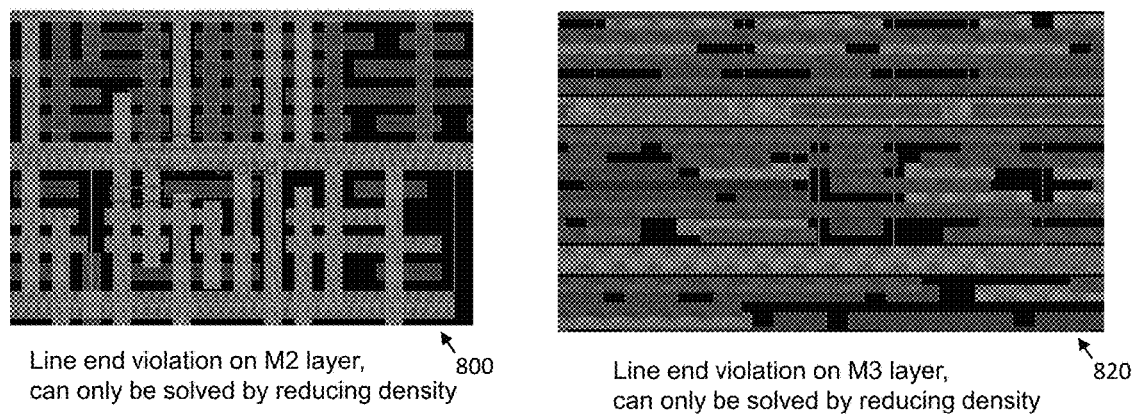
FIG. 13 illustrates example densities on the M2 layer and M3 layer, in accordance with an example embodiment.

FIG. 13 illustrates example densities on the M2 layer 800 and M3 layer 820, in accordance with an example embodiment. In the example of FIG. 13, the line-end (LE) violations can only be solved by reducing density. Different technologies are often utilized together in VLSI designs. EUV layers are the main pin access layers which are directly used for accessing pins of the standard cells for connectivity; thus, they have first degree impact on density of the design. To push the circuit density target, a very good line end solution is needed and defined. While a formal proof of optimality has not been prepared, in our experiments, it appears that an optimal solution is attained.

Extent Minimization

In one example embodiment, the following algorithm is used to minimize the sum of the lengths of all extents. The amount of path slack is defined for a selected extent and the influencing arcs are determined. A node is (randomly) selected and how much the node can be moved is defined. A determination is made regarding how many/which nodes the selected node can influence, and the other nodes are moved together with the selected node.

Let the starting graph $G^{<i>}$ be feasible;

insert arc $A_{i,j}$ w.l.o.g. (without loss of generality) to achieve $x_i - x_j \geq D$;

define slack $A_{i,j} = x_i - x_j - D$;

initialize two sets (all the nodes in these sets move together);

$$X_i \leftarrow \{x_i\}; X_j \leftarrow \{x_j\}$$

While Slack($A_{i,j}$)<0:
 If NegSlack($X_i$)>0 and −Cost($X_i$)<Cost($X_j$):
  Find Ancestor node $x_B$, with least slack $S_B$,
  Move $X_i$ by −min ($S_B$, −Slack($A_{i,j}$))

$$X_i \leftarrow X_i + \{x_B\}$$

Else If PosSlack($X_j$)≥0:
  Find Successor node $x_C$, with least slack $S_C$,
  Move $X_j$ by min ($S_C$, −Slack($A_{i,j}$))

$$X_j \leftarrow X_j + \{x_C\}$$

Else
  There is no feasible solution with arc $A_{i,j}$

If the algorithm gets here, then a feasible solution has been found (note, the solution may not be optimal).

Figure 14:
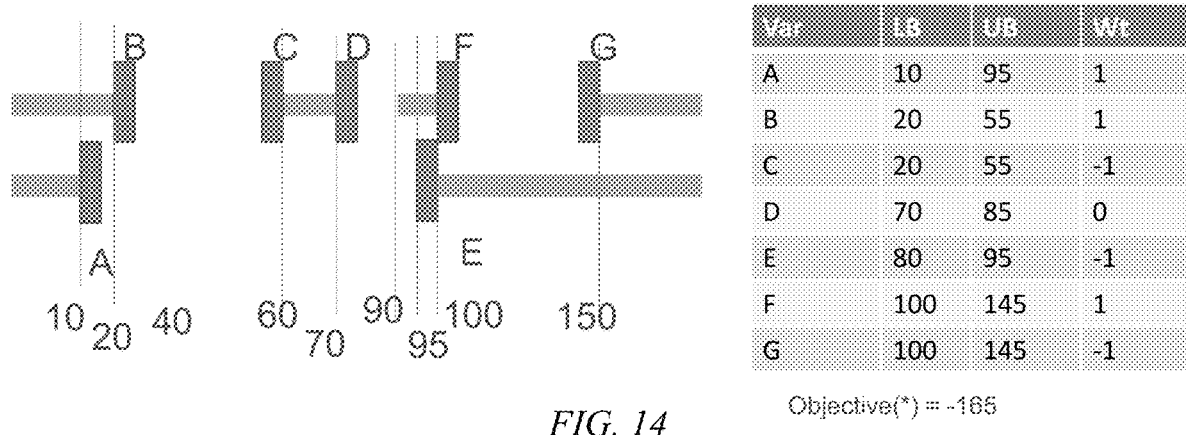
FIG. 14 illustrates a first example of trims positioned at ideal locations, in accordance with an example embodiment.

FIG. 14 illustrates a first example of trims positioned at ideal locations (located at the corresponding line end), in accordance with an example embodiment. In the example of FIG. 14, the table defines the lower bound (LB), the upper bound (UB), and the weight for each trim. For example, trim A can move from its current location (10) toward an upper bound of 95, the position of trim E, indicating a weight of +1 (where the units of the location are nanometers (nm)). Trim B can move from its current location (20) toward an upper bound of 55, the position of trim C, indicating a weight of +1. Trim C can move from its current location (55) toward a lower bound of 20, the position of trim B, indicating a weight of −1. Trim D can move from its current location (70) toward an upper bound of 85, just prior to the position of the next line end, indicating a weight of 0. Trim E can move from its current location (95) toward a lower bound of 10, indicating a weight of −1. Trim F can move from its current location (100) toward an upper bound of 145, the position of trim G, indicating a weight of +1. Trim G can move from its current location (145) toward a lower bound of 100, the position of trim F, indicating a weight of −1. The objective is computed based on a current position of a trim 204-1, 204-2, 204-3 multiplied by its weight. For example, in the table of FIG. 14, the position of A is 10, so the objective for trim A will be 10*1=10. Similarly, the objective for trim C will be 55*−1=−55. The objective is therefore −165, the sum of the individual objectives corresponding to each trim 204-1, 204-2, 204-3. Ideally, the trims align with their corresponding line end and no extents are required.

It will be appreciated that ideally, what would be desired is a trim length of zero with all constraints met. The table of FIG. 14 shows the lower bound, upper bound, and weight. Trim A can be merged with Trim E; the weight is "1" because the potential movement is going towards the upper bound (a weight of "−1" would be used when the potential movement is going towards the lower bound). Trim D is a single trim 204-1, 204-2, 204-3 in the gap or between two line ends; a value in the middle which corresponds to a weight "0" is therefore selected. All the gaps in FIG. 14 have two trims except that there is only one between 70 and 90.

With reference to FIG. 14, assume the trim origin is on its left edge, and the trim width equals 5 while the trim spacing on different tracks is 10. Thus, the adjacent trims on different tracks have Di,j=10+5=15. The trim spacing on the same track is 20; thus, the adjacent trims on the same track have Di,j=20+5=25.

Figure 15:
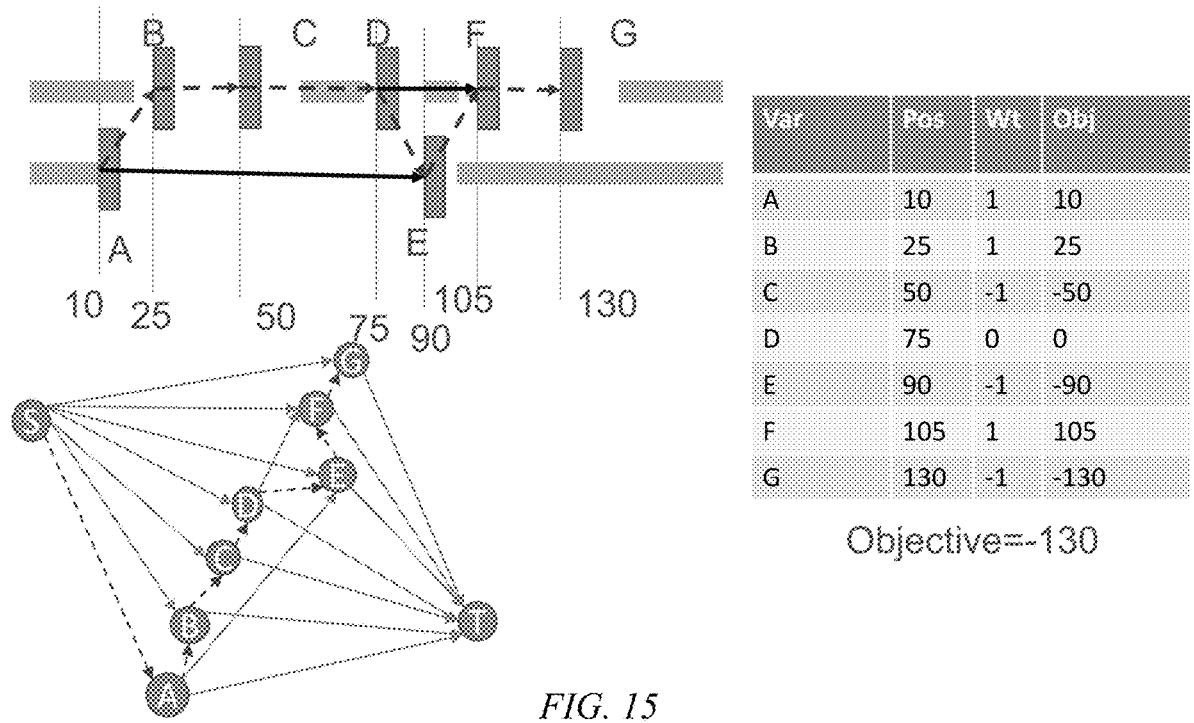
FIGS. 15, 16, 17, and 18 illustrate an example progression of the normalized graph to ascertaining a final graph, in accordance with an example embodiment.

In FIG. 15, source (S) and Sink (T) nodes have been included in an example constraint graph (the S and T nodes are given a position of 0 and 150, respectively, and are not allowed to move). Constraint arcs with S and T are given a value that depends on the Lower and Upper bound of the second node (node A), where $x_S=0$, $x_T=150$, $x_A - x_S \geq 10$ and $x_T - x_A \geq 95$.

In FIG. 15, each trim meets one design rule but not all the design rules; each trim meets the lower bound or upper bound. The lower bound and upper bound are determined by spacing with respect to the neighboring trims. Many design rules are still violated which are now to be fixed one-by-one.

In one example embodiment, an initial basic feasible solution is computed where the solution is represented by a spanning tree of tight arcs of the graph (a tight arc is an arc with zero slack; see dashed line arcs in FIG. 15). The longest path algorithm then computes the solution. A feasible solution is a solution that satisfies all design constraints; in other words, all arcs have non-negative slacks.

In one or more embodiments, an iteration over every node is performed until no improvement can be attained. In one example embodiment, a determination is made of whether a change to a node value will improve the objective where:

a node $n_i$ can move in only one direction where:
All nodes in the tight arc sub-tree rooted at node $n_i$ also get moved and $d_j$ is the movement of the node $n_i$ based on the slack of the arc having the least amount of slack;
the cost of movement is $C_i = w_i \Sigma d_j$, $j \in$ SubTree(i).

Hence, a movement improves the objective if $C_i$<0 (minimize). This movement is referred to as a PIVOT. If a PIVOT on node $n_i$ has cost $C_i$<0, then:

1) implement the pivot;
2) Find the arc A with the least slack in the direction corresponding to $w_i$ of all the nodes in SubTree(i);
3) let d be the slack of the least slack arc A; move SubTree(i) by $w_i d$, where $w_i d$ represents the total movement of the corresponding node; and
4) A becomes a tight arc; update the tight tree arc.

FIGS. 15, 16, 17, and 18 illustrate an example progression of the normalized graph to ascertaining a final graph, in accordance with an example embodiment. As illustrated in FIG. 15 (outcome of the longest path algorithm), the trims are moved to their minimum lower bound based on satisfying the design rules. For example, the position of trim B is now 25, which is required to meet the minimum spacing requirement with trim A. While the objective is now −130, design rules are still being violated. As noted above, each trim meets one design rule but not all the design rules; each trim meets the lower bound or upper bound. The lower bound and upper bound are determined by spacing with respect to the neighboring trims. This is done for all the trims with an objective of −130. As discussed, many design rules are still violated which are now to be fixed one-by-one. Every node is moving towards its lower bound, although nodes may be moved towards their upper bound to satisfy a design rule.

Figure 16:
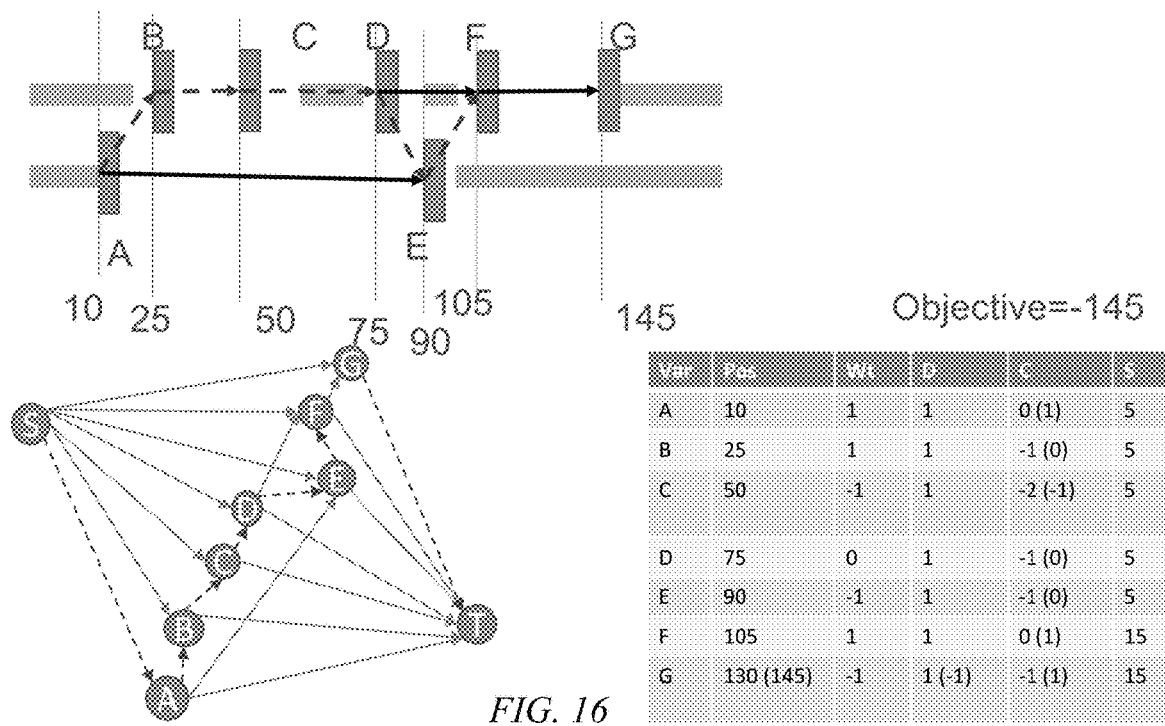

To minimize the total lengths of the extents, trims may be considered individually. For example, as illustrated in FIG. 16, trim G may be randomly selected as a pivot point and moved back to its original location (e.g., decided based on the node pivot and slack computation as explained above) without violating any design rule while also making the length of the corresponding extent zero. In general, a trim selected as a pivot point may be moved to minimize the length of the extents while conforming to the design rules and, if necessary, may be moved in concert with one or more other trims such that the extent lengths are minimized while the design rules are satisfied.

Figure 17:
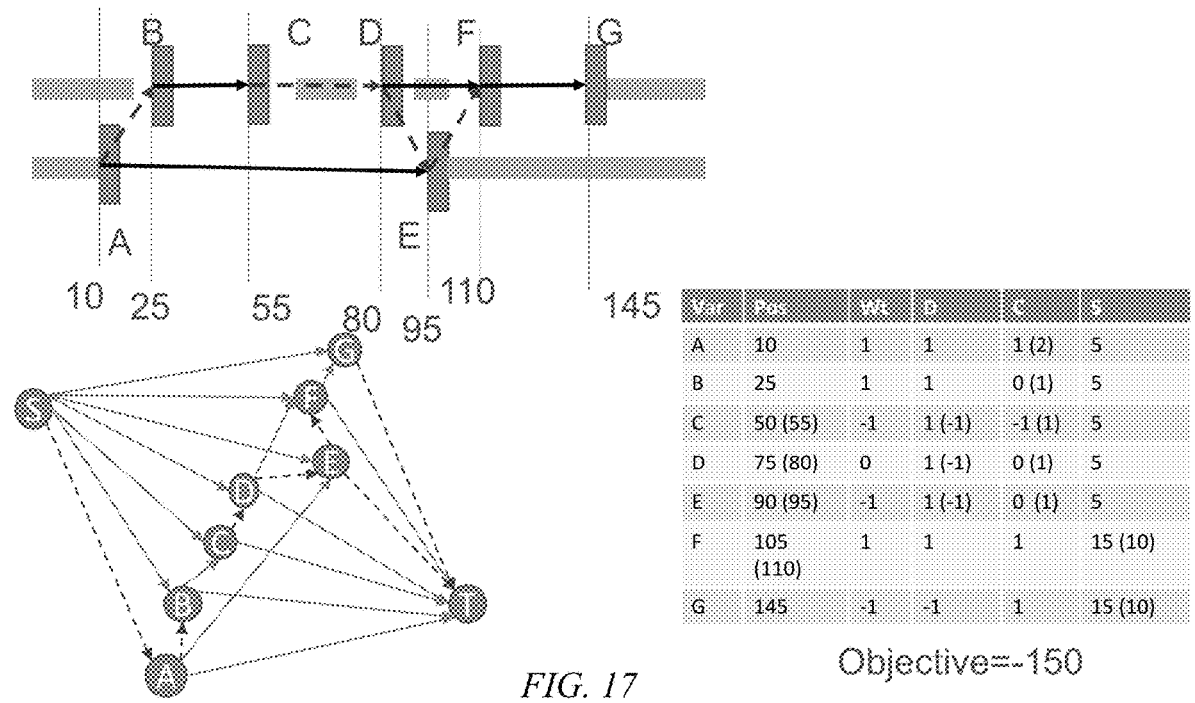
Figure 18:
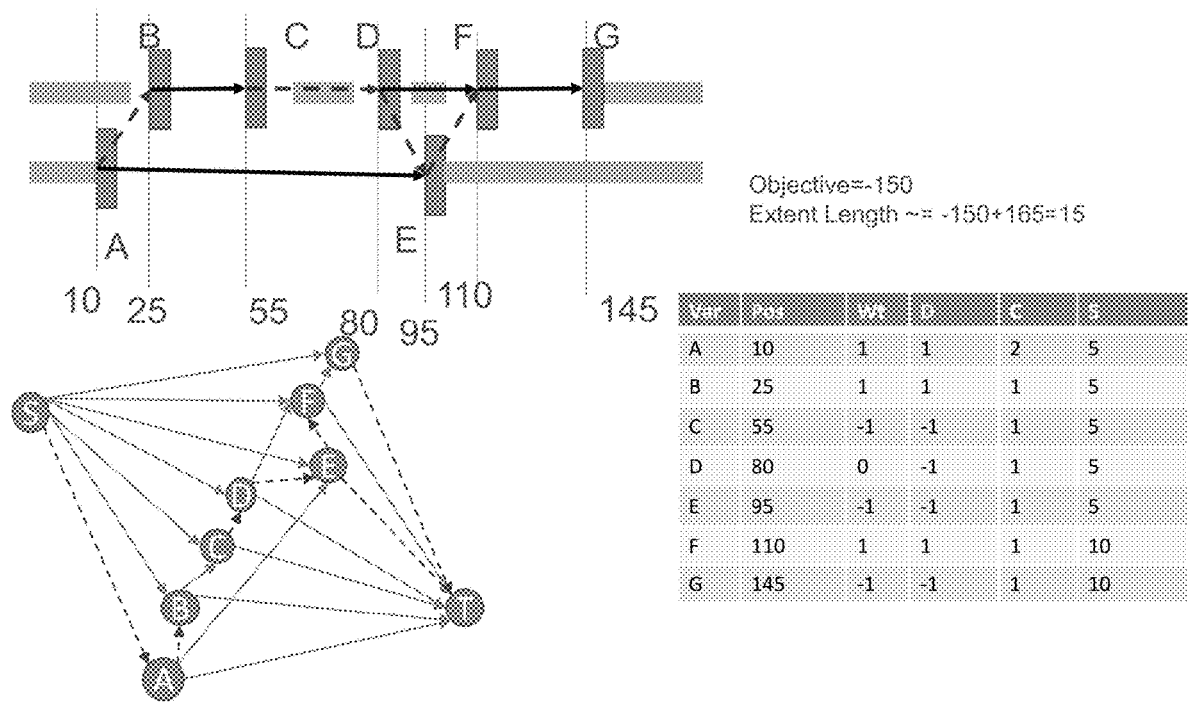

Considering trim C next as the (randomly selected) pivot, trim C can be moved towards its upper bound, but is limited by trims D, E and F. Trim C cannot be moved arbitrarily towards its upper bound position (which is 55) as the movement is restricted by the spacing constraints among trims D, E and F. Therefore, trims D, E and F can only be moved based on the slack of the trim having the smallest amount of available slack. In this example, trim E has the least amount of available movement; the slack for trim E is therefore used as the slack for the group of trims: C, D, E and F. All the nodes in the group can only be moved with the slack of trim E. Thus, trims C, D, E and F are moved toward their upper bound together. As illustrated in FIG. 17, trims C, D, E and F are moved until trim E is moved back to its original location without violating any design rule while also making the length of the corresponding extent zero. At this point, no further improvement may be made (no more extra slack) and trims A, E and G do not require an extent. FIG. 18 illustrates the final positions of the trims A, B, C, D, E, F, and G.

One or more embodiments thus provide a technology-independent infrastructure modelling for a line end solution dealing with the requirements of different foundries; a common mathematical model to deal with SADP and EUV constraints; an integer variable ordering algorithm for a practical ILP solution, resulting in very fast runtime and guaranteed solution; and/or wirelength minimization with a longest path algorithm along with slack minimization algorithm, resulting in achieving density goals for modern IC designs (e.g., microprocessors and the like).

One or more embodiments advantageously create a technology independent architecture for routing. One or more embodiments employ a common mathematical model to deal with Extreme Ultraviolet Lithography (EUV) and multi patterning-based lithography solutions (SADP) constraints; utilize an integer variable ordering algorithm for a practical integer linear program (ILP) solution, resulting in very fast runtime and guaranteed solution; and/or minimize a wirelength with a longest path algorithm along with a slack minimization algorithm for achieving density goals for modern IC chips (e.g., powerful high-speed microprocessors).

Recapitulation

Given the discussion thus far, it will be appreciated that, in general terms, an exemplary method, according to an aspect of the invention, includes the operations of modelling one or more line ends of a putative integrated circuit design using a constraint graph (FIG. 10); applying a longest path algorithm on subgraphs of the constraint graph; carrying out an extent minimization algorithm on the subgraphs of the constraint graph; and carrying out routing on the putative integrated circuit design based on results of the longest path algorithm and the extent minimization algorithm. In one aspect, a non-transitory computer readable medium comprises computer executable instructions which when executed by a computer cause the computer to perform a method comprising modelling one or more line ends of a putative integrated circuit design using a constraint graph (FIG. 10); applying a longest path algorithm on subgraphs of the constraint graph; carrying out an extent minimization algorithm on the subgraphs of the constraint graph; and carrying out routing on the putative integrated circuit design based on results of the longest path algorithm and the extent minimization algorithm.

In one aspect, an apparatus comprises a memory and at least one processor, coupled to the memory, and operative to perform operations comprising modelling one or more line ends of a putative integrated circuit design using a constraint graph (FIG. 10); applying a longest path algorithm on subgraphs of the constraint graph; carrying out an extent minimization algorithm on the subgraphs of the constraint graph; and carrying out routing on the putative integrated circuit design based on results of the longest path algorithm and the extent minimization algorithm.

In one example embodiment, carrying out the extent minimization algorithm comprises applying an optimization objective to minimize a total length of extents of at least a plurality of line ends. In one example embodiment, a weight $w_i \in \{-1, 0, 1\}$ is assigned to each node $n_i$ of the constraint graph, wherein a weight of −1 is assigned if a corresponding trim 204-1, 204-2, 204-3 is being repositioned towards a corresponding lower bound, a weight of 0 is assigned if the corresponding trim 204-1, 204-2, 204-3 is remaining in a current position, and a weight of +1 is assigned if the corresponding trim 204-1, 204-2, 204-3 is being repositioned towards a corresponding upper bound, wherein carrying out the extent minimization algorithm comprises utilizing the weights $w_i \in \{-1, 0, 1\}$ to minimize a total length of extents 212-1, 212-2, 212-3, 212-4. In one example embodiment, the constraint graph is created, wherein the constraint graph is represented as a constraint graph G; and a further step includes modelling at least a portion of the line ends by: modeling a potential trim shape $S_i$ for Self-Aligned Double Patterning (SADP) technology as a corresponding node $v_i \in V$ in the constraint graph G(V, E) for a layout L(R) that includes rectangular metal shapes $R = \{R_i | i = 1, \ldots, |R|\}$ representing candidate wires 208-1, 208-2, 208-3, 208-4; and modeling a position of a line end $T_i$ for Extreme Ultraviolet Lithography (EUV) technology as a corresponding node $v_i \in V$ in the graph G(V, E) for the layout L(R).

In one example embodiment, the modelling of at least a portion of the line ends is based on bounding a position of each potential trim shape $S_i$ by positions of the rectangular metal shapes R, wherein a lower bound is denoted $L_i$ and an upper bound is denoted $U_i$, wherein each rectangular metal shape has two movable line ends, and wherein a variable $x_i$ represents a position of the corresponding movable line end. In one example embodiment, the modelling at least a portion of the line ends is based on a representation of spacing relationships between neighboring trim shapes $S_i$ and $S_j$ as arcs $e_{i,j} \in E$ of the constraint graph G, wherein each arc $e_{i,j}$ is accompanied by a pair of integer variables $\{a_{i,j}, b_{i,j}\}$ and a set of constants $\{W_{i,j}, D^h_{i,j}, D^l_{i,j}, c_{i,j}\}$, wherein $D^h_{i,j}, D^l_{i,j}$ are different spacing constraints between the nodes $v_i$, $c_{i,j}$ is an integer variable, and $W_{i,j}$ is a weight assigned based on weights of nodes identified by indices i and j.

In one example embodiment, the spacing relationships between two neighboring trim shapes are given by:

$$x_j - x_i - a_{i,j} * D^l_{i,j} + b_{i,j} * W_{i,j} \geq 0$$

$$x_i - x_j + a_{i,j} * W_{i,j} - b_{i,j} * D^h_{i,j} \geq 0$$

$$c_{i,j} <= a_{i,j} + b_{i,j} <= 1, a_{i,j}, b_{i,j}, c_{i,j} \in \{0,1\}$$

In one example embodiment, $\Sigma_{i \in n} w_i x_i$ is minimized subject to the spacing relationships, wherein $L_i \leq x_i \leq U_i$. In one example embodiment, design rules are modelled with simplifications of the spacing relationships based on variables defined as:

$a_{i,j}=1$, $b_{i,j}=0$, and $D^l_{i,j}=D_t$ or $D^l_{i,j}=D_u$ for type "A" arcs,
$b_{i,j}=0$ and $D^l_{i,j}=D_t$ for type "B" arcs;
$c_{i,j}=0$, $D^l=D_u$ and $D^h_{i,j}=D_u$ for type "C" arcs;
$c_{i,j}=1$, $D^l_{i,j}=D_{t1}$ and $D^h_{i,j}=D_{t2}$ for type "D" arcs; and
$c_{i,j}=1$, $D^l_{i,j}=D_h$, $D^h_{i,j}=D_h$, $c_{i,j}=1$, $D^l_{i,j}=-D_l$, and $D^h_{i,j}=-D_l$ for type "E" arcs.

In one example embodiment, one or more artificial trims are defined for those of the line ends for Extreme Ultraviolet Lithography (EUV). In one example embodiment, an extent 212-1, 212-2, 212-3, 212-4 is inserted into a routing design to extend a corresponding metal wire 208-1, 208-2, 208-3, 208-4 to a location of a corresponding trim 204-1, 204-2, 204-3. In one example embodiment, arcs of the constraint graph are grouped by type to process more complex arcs (as compared to other arcs that are present) first, the grouped arcs are ordered in a deterministic order (e.g., alphabetical or other suitable order), the arcs within each ordered group are ordered by a corresponding initial slack $K_{i,j}$ wherein more restrictive arcs within a group ordered by slack are processed first, and one or more feasible regions for each arc are ordered from left to right or right to left, such that a region nearest to an ideal solution is processed first.

Figure 21:
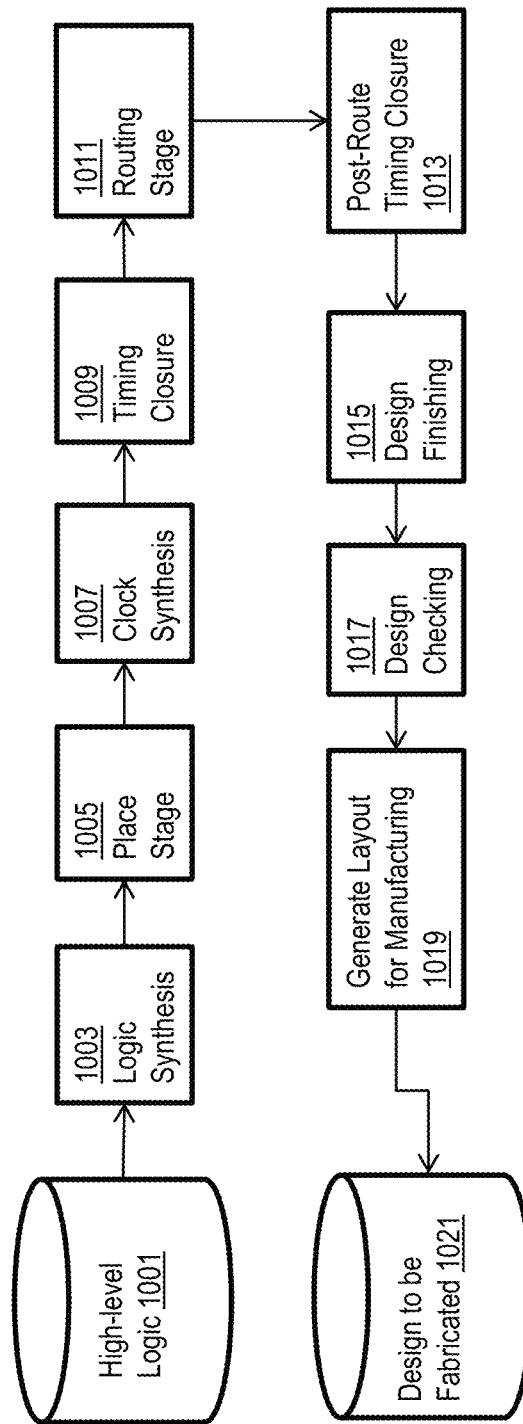
FIG. 21 shows further aspects of IC fabrication from physical design data.

Referring briefly to FIG. 21, discussed in more detail elsewhere herein, it will be appreciated that there may be additional steps following the routing 1011, but prior to fabrication, such as operations 1013-1019. One or more embodiments are carried out during routing stage 1011. For example, only routing that is associated with technologies that have complex rules, such as EUV, are checked outside the router and other technologies that have less complex rules are checked within the router during routing stage 1011.

In one or more embodiments, a further step includes fabricating a physical integrated circuit in accordance with the VLSI design. One non-limiting specific example of accomplishing this is described elsewhere herein in connection with FIGS. 20-22. For example, a design structure, based on the resulting routing solution and the corresponding VLSI design (i.e., design based on the routing solution and subsequent steps such as in FIG. 16), is provided to fabrication equipment to facilitate fabrication of a physical integrated circuit in accordance with the design structure.

In one or more embodiments, a layout is prepared based on the analysis. In one or more embodiments, the layout is instantiated as a design structure. In one or more embodiments, a physical integrated circuit is fabricated in accordance with the design structure.

Figure 20:
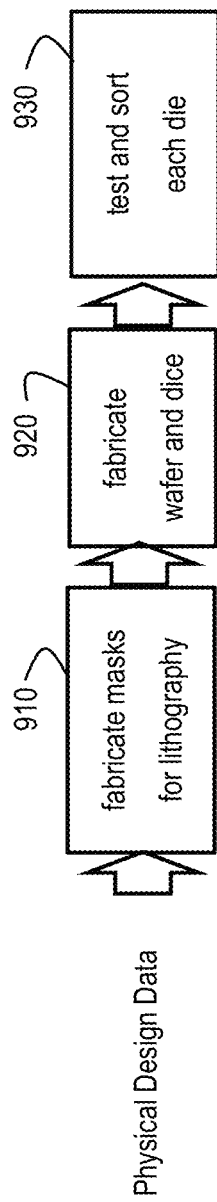
FIG. 20 is a flow diagram of a design process used in semiconductor design, manufacture, and/or test.

As noted, in one or more embodiments, the layout is instantiated as a design structure. A physical integrated circuit is then fabricated in accordance with the design structure. Refer also to discussion for FIGS. 20-22. FIG. 20 is a flow diagram of a design process used in semiconductor design, manufacture, and/or test. Once the physical design data is obtained, based, in part, on the design processes described herein, an integrated circuit designed in accordance therewith can be fabricated according to known processes that are generally described with reference to FIG. 20. Generally, a wafer with multiple copies of the final design is fabricated and cut (i.e., diced) such that each die is one copy of the integrated circuit. At block 910, the processes include fabricating masks for lithography based on the finalized physical layout. At block 920, fabricating the wafer includes using the masks to perform photolithography and etching. Once the wafer is diced, testing and sorting each die is performed at 930 to filter out any faulty die. Furthermore, referring to FIGS. 20-22, in one or more embodiments the at least one processor is operative to generate a design structure for the integrated circuit design in accordance with the VLSI design, and in at least some embodiments, the at least one processor is further operative to control integrated circuit manufacturing equipment to fabricate a physical integrated circuit in accordance with the design structure. Thus, the layout can be instantiated as a design structure, and the design structure can be provided to fabrication equipment to facilitate fabrication of a physical integrated circuit in accordance with the design structure. The physical integrated circuit will be improved (for example, because of proper capacitance extraction) compared to circuits designed using prior art techniques, at least under conditions where there is the same CPU time budget for the design process. To achieve similar improvements with prior-art techniques, even if possible, would require expenditure of more CPU time as compared to embodiments of the invention.

Figure 19:
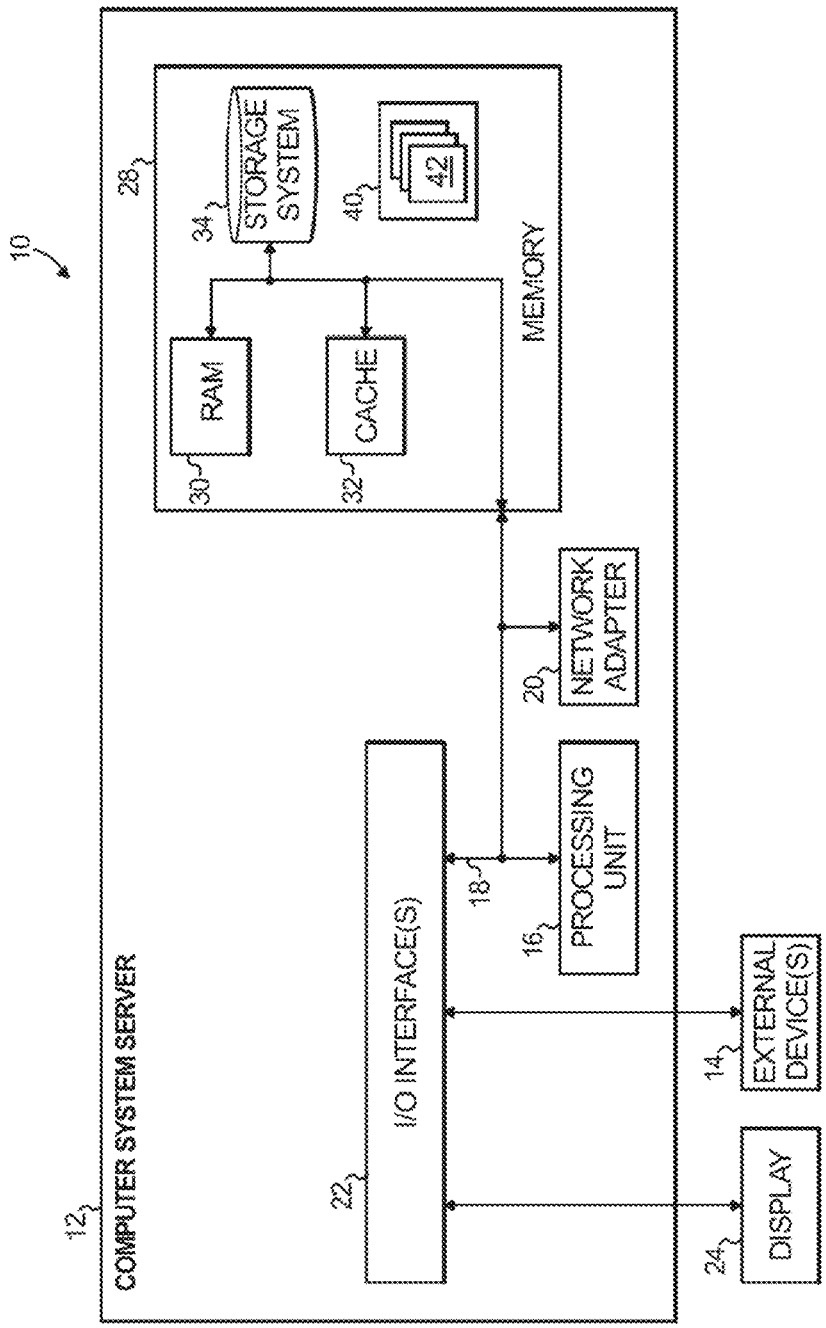
FIG. 19 depicts a computer system that may be useful in implementing one or more aspects and/or elements of the invention.

FIG. 19 depicts a computer system that may be useful in implementing one or more aspects and/or elements of the invention. One or more embodiments include a computer including a memory 28; and at least one processing unit 16, coupled to the memory, and operative to carry out or otherwise facilitate any one, some, or all of the method steps described herein.

FIG. 21 depicts an example high-level Electronic Design Automation (EDA) tool flow, which is responsible for creating an optimized microprocessor (or other IC) design to be manufactured. A designer could start with a high-level logic description 1001 of the circuit (e.g. VHDL or Verilog). The logic synthesis tool 1003 compiles the logic, and optimizes it without any sense of its physical representation, and with estimated timing information. The placement tool 1005 takes the logical description and places each component, looking to minimize congestion in each area of the design. The clock synthesis tool 1007 optimizes the clock tree network by cloning/balancing/buffering the latches or registers. The timing closure step 1009 performs a number of optimizations on the design, including buffering, wire tuning, and circuit repowering; its goal is to produce a design which is routable, without timing violations, and without excess power consumption. The routing stage 1011 takes the placed/optimized design, and determines how to create wires to connect all of the components, without causing manufacturing violations. Post-route timing closure 1013 performs another set of optimizations to resolve any violations that are remaining after the routing. Design finishing 1015 then adds extra metal shapes to the netlist, to conform with manufacturing requirements. The checking steps 1017 analyze whether the design is violating any requirements such as manufacturing, timing, power, electromigration or noise. When the design is clean, the final step 1019 is to generate a layout for the design, representing all the shapes to be fabricated in the design to be fabricated 1021.

Exemplary System

One or more embodiments of the invention, or elements thereof, can be implemented in the form of an apparatus including a memory and at least one processor that is coupled to the memory and operative to perform exemplary method steps. FIG. 19 depicts a computer system that may be useful in implementing one or more aspects and/or elements of the invention. The system is depicted as a cloud computing node 10 but is also representative of computer useful in non-cloud and/or hybrid implementations.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 19, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 19, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 19) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Exemplary Design Process Used in Semiconductor Design, Manufacture, and/or Test

Figure 22:
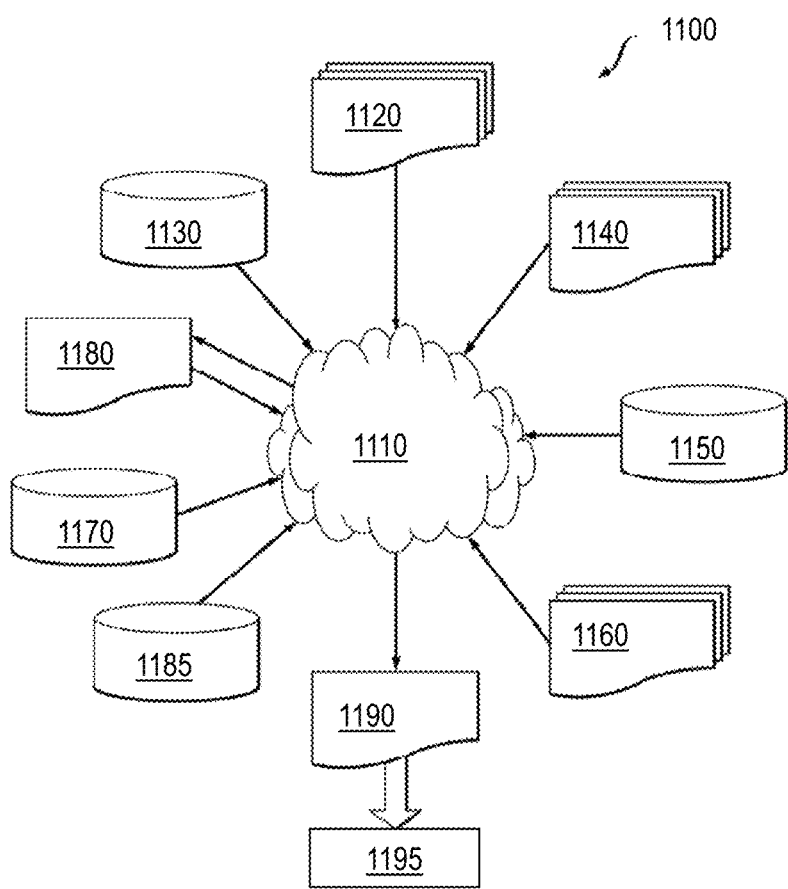
FIG. 22 shows an exemplary high-level Electronic Design Automation (EDA) tool flow, within which aspects of the invention can be employed.

One or more embodiments integrate the timing analysis techniques herein with semiconductor integrated circuit design simulation, test, layout, and/or manufacture. In this regard, FIG. 22 shows a block diagram of an exemplary design flow 1100 used for example, in semiconductor IC logic design, simulation, test, layout, and manufacture. Design flow 1100 includes processes, machines and/or mechanisms for processing design structures or devices to generate logically or otherwise functionally equivalent representations of design structures and/or devices, such as those that can be analyzed using timing analysis or the like. The design structures processed and/or generated by design flow 1100 may be encoded on machine-readable storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1100 may vary depending on the type of representation being designed. For example, a design flow 1100 for building an application specific IC (ASIC) may differ from a design flow 1100 for designing a standard component or from a design flow 1100 for instantiating the design into a programmable array, for example a programmable gate array (PGA) or a field programmable gate array (FPGA) offered by Altera® Inc. or Xilinx® Inc.

FIG. 22 illustrates multiple such design structures including an input design structure 1120 that is preferably processed by a design process 1110. Design structure 1120 may be a logical simulation design structure generated and processed by design process 1110 to produce a logically equivalent functional representation of a hardware device. Design structure 1120 may also or alternatively comprise data and/or program instructions that when processed by design process 1110, generate a functional representation of the physical structure of a hardware device. Whether representing functional and/or structural design features, design structure 1120 may be generated using electronic computer-aided design (ECAD) such as implemented by a core developer/designer. When encoded on a gate array or storage medium or the like, design structure 1120 may be accessed and processed by one or more hardware and/or software modules within design process 1110 to simulate or otherwise functionally represent an electronic component, circuit, electronic or logic module, apparatus, device, or system. As such, design structure 1120 may comprise files or other data structures including human and/or machine-readable source code, compiled structures, and computer executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1110 preferably employs and incorporates hardware and/or software modules for synthesizing, translating, or otherwise processing a design/simulation functional equivalent of components, circuits, devices, or logic structures to generate a Netlist 1180 which may contain design structures such as design structure 1120. Netlist 1180 may comprise, for example, compiled or otherwise processed data structures representing a list of wires, discrete components, logic gates, control circuits, I/O devices, models, etc. that describes the connections to other elements and circuits in an integrated circuit design. Netlist 1180 may be synthesized using an iterative process in which netlist 1180 is resynthesized one or more times depending on design specifications and parameters for the device. As with other design structure types described herein, netlist 1180 may be recorded on a machine-readable data storage medium or programmed into a programmable gate array. The medium may be a nonvolatile storage medium such as a magnetic or optical disk drive, a programmable gate array, a compact flash, or other flash memory. Additionally, or in the alternative, the medium may be a system or cache memory, buffer space, or other suitable memory.

Design process 1110 may include hardware and software modules for processing a variety of input data structure types including Netlist 1180. Such data structure types may reside, for example, within library elements 1130 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1140, characterization data 1150, verification data 1160, design rules 1170, and test data files 1185 which may include input test patterns, output test results, and other testing information. Design process 1110 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1110 without deviating from the scope and spirit of the invention. Design process 1110 may also include modules for performing standard circuit design processes such as timing analysis, verification, design rule checking, place and route operations, etc. Improved placement can be performed as described herein.

Design process 1110 employs and incorporates logic and physical design tools such as HDL compilers and simulation model build tools to process design structure 1120 together with some or all of the depicted supporting data structures along with any additional mechanical design or data (if applicable), to generate a second design structure 1190. Design structure 1190 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 1120, design structure 1190 preferably comprises one or more files, data structures, or other computer-encoded data or instructions that reside on data storage media and that when processed by an ECAD system generate a logically or otherwise functionally equivalent form of one or more IC designs or the like. In one embodiment, design structure 1190 may comprise a compiled, executable HDL simulation model that functionally simulates the devices to be analyzed.

Design structure 1190 may also employ a data format used for the exchange of layout data of integrated circuits and/or symbolic data format (e.g. information stored in a GDSII (GDS2), GL1, OASIS, map files, or any other suitable format for storing such design data structures). Design structure 1190 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described herein (e.g., .lib files). Design structure 1190 may then proceed to a stage 1195 where, for example, design structure 1190: proceeds to tape-out, is released to manufacturing, is released to a mask house, is sent to another design house, is sent back to the customer, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   modelling one or more line ends of a integrated circuit design using a constraint graph;
   applying a longest path algorithm on subgraphs of said constraint graph;
   carrying out an extent minimization algorithm on said subgraphs of said constraint graph, wherein each extent is a routing symbol that represents a metal shape that extends a given wire to a given location of a given trim, wherein each given trim creates a line end break; and
   carrying out routing on said integrated circuit design based on results of said longest path algorithm and said extent minimization algorithm.

2. The method of claim 1, wherein carrying out said extent minimization algorithm comprises applying an optimization objective to minimize a total length of extents of at least a plurality of line ends.

3. The method of claim 2, further comprising assigning a weight $w_i \in \{-1,0,1\}$ to each node $n_i$ of the constraint graph, wherein a weight of −1 is assigned if a corresponding trim is being repositioned towards a corresponding lower bound, a weight of 0 is assigned if the corresponding trim is remaining in a current position, and a weight of +1 is assigned if the corresponding trim is being repositioned towards a corresponding upper bound, wherein carrying out said extent minimization algorithm comprises utilizing said weights $w_i \in \{-1,0,1\}$ to minimize a total length of extents.

4. The method of claim 2, further comprising creating the constraint graph, wherein the constraint graph is represented as a constraint graph G; further comprising modelling at least a portion of the line ends by:
   modeling a potential trim shape $S_i$ for Self-Aligned Double Patterning (SADP) technology as a corresponding node $v_i \in V$ in the constraint graph G(V, E) for a layout L(R) that includes rectangular metal shapes $R = \{R_i | i=1, \ldots, |R|\}$ representing candidate wires; and
   modeling a position of a line end $T_i$ for Extreme Ultraviolet Lithography (EUV) technology as a corresponding node $v_i \in V$ in the graph G(V, E) for the layout L(R).

5. The method of claim 4, wherein the modelling of at least a portion of the line ends is based on bounding a position of each potential trim shape $S_i$ by positions of the rectangular metal shapes R, wherein a lower bound is denoted $L_i$ and an upper bound is denoted $U_i$, wherein each rectangular metal shape has two movable line ends, and wherein a variable $x_i$ represents a position of the corresponding movable line end.

6. The method of claim 4, wherein the modelling at least a portion of the line ends is based on a representation of spacing relationships between neighboring trim shapes $S_i$ and $S_j$ as arcs $e_{i,j} \in E$ of the constraint graph G, wherein each arc $e_{i,j}$ is accompanied by a pair of integer variables $\{a_{i,j}, b_{i,j}\}$ and a set of constants $\{W_{i,j}, D^h_{i,j}, D^l_{i,j}, c_{i,j}\}$, wherein $D^h_{i,j}, D^l_{i,j}$ are different spacing constraints between the nodes $v_i$, $c_{i,j}$ is an integer variable, and $W_{i,j}$ is a weight assigned based on weights of nodes identified by indices i and j.

7. The method of claim 6, wherein the spacing relationships between two neighboring trim shapes are given by:

$$x_j - x_i - a_{i,j} D^l_{i,j} + b_{i,j} * W_{i,j} \geq 0$$

$$x_i - x_j + a_{i,j} * W_{i,j} - b_{i,j} * D^h_{i,j} \geq 0$$

$$c_{i,j} <= a_{i,j} + b_{i,j} <= 1, a_{i,j}, b_{i,j}, c_{i,j} \in \{0,1\}$$

8. The method of claim 7, further comprising minimizing $\Sigma_{i \in n} w_i x_i$ subject to the spacing relationships, wherein $L_i \leq x_i \leq U_i$.

9. The method of claim 7, wherein design rules are modelled with simplifications of the spacing relationships based on variables defined as:
   $a_{i,j}=1$, $b_{i,j}=0$, and $D^l_{i,j}=D_t$ or $D^l_{i,j}=D_u$ for type "A" arcs,
   $b_{i,j}=0$ and $D^l_{i,j}=D_t$ for type "B" arcs;
   $c_{i,j}=0$, $D^l_{i,j}=D_u$ and $D^h_{i,j}=D_u$ for type "C" arcs;
   $c_{i,j}=1$, $D^l_{i,j}=D_{t1}$ and $D^h_{i,j}=D_{t2}$ for type "D" arcs; and
   $c_{i,j}=1$, $D^l_{i,j}=D_h$, $D^h_{i,j}=D_h$, $c_{i,j}=1$, $D^l_{i,j}=-D_l$, and $D^h_{i,j}=-D_l$ for type "E" arcs.

10. The method of claim 4, further comprising defining one or more artificial trims for those of said line ends for Extreme Ultraviolet Lithography (EUV).

11. The method of claim 4, further comprising inserting an extent into a routing design to extend a corresponding metal wire to a location of a corresponding trim.

12. The method of claim 4, further comprising:
   grouping arcs of the constraint graph by type to process more complex arcs first;
   ordering the grouped arcs in a deterministic order;
   ordering the arcs within each ordered group by a corresponding initial slack $K_{i,j}$ wherein more restrictive arcs within a group ordered by slack are processed first; and
   ordering one or more feasible regions for each arc from left to right or right to left, such that a region nearest to an ideal solution is processed first.

13. A non-transitory computer readable medium comprising computer executable instructions which when executed by a computer cause the computer to perform a method comprising:
   modelling one or more line ends of a integrated circuit design using a constraint graph;
   applying a longest path algorithm on subgraphs of said constraint graph;
   carrying out an extent minimization algorithm on said subgraphs of said constraint graph, wherein each extent is a routing symbol that represents a metal shape that extends a given wire to a given location of a given trim, wherein each given trim creates a line end break; and
   carrying out routing on said integrated circuit design based on results of said longest path algorithm and said extent minimization algorithm.

14. An apparatus, comprising:
   a memory; and
   at least one processor, coupled to said memory, and operative to perform operations comprising:
      modelling one or more line ends of a integrated circuit design using a constraint graph;
      applying a longest path algorithm on subgraphs of said constraint graph;
      carrying out an extent minimization algorithm on said subgraphs of said constraint graph, wherein each extent is a routing symbol that represents a metal shape that extends a given wire to a given location of a given trim, wherein each given trim creates a line end break; and
      carrying out routing on said integrated circuit design based on results of said longest path algorithm.

15. The apparatus of claim 14, wherein carrying out said extent minimization algorithm comprises applying an optimization objective to minimize a total length of extents of at least a plurality of line ends.

16. The apparatus of claim 15, the operations performed by the at least one processor further comprising assigning a weight $w_i \in \{-1,0,1\}$ to each node $n_i$ of the constraint graph, wherein a weight of −1 is assigned if a corresponding trim is being repositioned towards a corresponding lower bound, a weight of 0 is assigned if the corresponding trim is remaining in a current position, and a weight of +1 is assigned if the corresponding trim is being repositioned towards a corresponding upper bound, wherein carrying out said extent minimization algorithm comprises utilizing said weights $w_i \in \{-1,0,1\}$ to minimize a total length of extents.

17. The apparatus of claim 15, the operations performed by the at least one processor further comprising creating the constraint graph, wherein the constraint graph is represented as a constraint graph G; further comprising modelling at least a portion of the line ends by:
   modeling a potential trim shape $S_i$ for Self-Aligned Double Patterning (SADP) technology as a corresponding node $v_i \in V$ in the constraint graph G(V, E) for a layout L(R) that includes rectangular metal shapes R={$R_i$|i=1, ..., |R|} representing candidate wires; and
   modeling a position of a line end $T_i$ for Extreme Ultraviolet Lithography (EUV) technology as a corresponding node $v_i \in V$ in the graph G(V, E) for the layout L(R).

18. The apparatus of claim 17, wherein the modelling of at least a portion of the line ends is based on bounding a position of each potential trim shape $S_i$ by positions of the rectangular metal shapes R, wherein a lower bound is denoted $L_i$ and an upper bound is denoted $U_i$, wherein each rectangular metal shape has two movable line ends, and wherein a variable $x_i$ represents a position of the corresponding movable line end.

19. The apparatus of claim 17, the operations performed by the at least one processor further comprising defining one or more artificial trims for those of said line ends for Extreme Ultraviolet Lithography (EUV).

20. The apparatus of claim 17, the operations performed by the at least one processor further comprising:
   grouping arcs of the constraint graph by type to process more complex arcs first;
   ordering the grouped arcs in a deterministic order;
   ordering the arcs within each ordered group by a corresponding initial slack $K_{i,j}$ wherein more restrictive arcs within a group ordered by slack are processed first; and ordering one or more feasible regions for each arc from left to right or right to left, such that a region nearest to an ideal solution is processed first.

* * * * *